(12) United States Patent
Lee et al.

(10) Patent No.: US 11,462,010 B2
(45) Date of Patent: Oct. 4, 2022

(54) ELECTRONIC APPARATUS, AND METHOD FOR CONTROLLING SAME

(71) Applicant: Samsung Electronics Co., Ltd., Gyeonggi-do (KR)

(72) Inventors: Boram Lee, Seoul (KR); Jung-Kun Lee, Seoul (KR); Yeseul Hong, Seoul (KR); Jieun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 231 days.

(21) Appl. No.: 16/479,993

(22) PCT Filed: Dec. 7, 2017

(86) PCT No.: PCT/KR2017/014270
§ 371 (c)(1),
(2) Date: Jul. 23, 2019

(87) PCT Pub. No.: WO2018/135750
PCT Pub. Date: Jul. 26, 2018

(65) Prior Publication Data
US 2019/0370547 A1 Dec. 5, 2019

(30) Foreign Application Priority Data
Jan. 23, 2017 (KR) .................. 10-2017-0010304

(51) Int. Cl.
G06V 20/20 (2022.01)
G06F 3/04817 (2022.01)
(Continued)

(52) U.S. Cl.
CPC .......... G06V 20/20 (2022.01); G06F 3/04817 (2013.01); G06F 3/04845 (2013.01); G06V 2201/10 (2022.01); H04M 1/0202 (2013.01)

(58) Field of Classification Search
None
See application file for complete search history.

(56) References Cited

U.S. PATENT DOCUMENTS 9,734,634 B1 * 8/2017 Mott ................. G06F 3/0304
10,733,649 B2 * 8/2020 Chen ................. G06F 16/58
(Continued)

FOREIGN PATENT DOCUMENTS

KR 10-2012-0108496 A 10/2012
KR 10-2013-0116148 A 10/2013
(Continued)

OTHER PUBLICATIONS

Naver 'Snow' Cacao 'Cheese', Self-confident; 5 pages; http://www.enewstoday.co.kr/news/articleView.html?idxno=586810.
(Continued)

Primary Examiner — Leon Viet Q Nguyen
(74) Attorney, Agent, or Firm — Cha & Reiter, LLC

(57) ABSTRACT

The various embodiments of the present invention relate to an electronic apparatus, and a method for controlling same. The electronic apparatus according to the present invention comprises a display, a communication module, and a processor electrically connected to the display and communication module, wherein the processor controls so that an object detected in an image displayed on the display is recognized, and one or more elements contained in the object are classified and displayed on the display, and can control so that an image similar to the detected object is searched for, by means of the communication module, and displayed on the display.

14 Claims, 15 Drawing Sheets

(51) Int. Cl.
*G06F 3/04845* (2022.01)
*H04M 1/02* (2006.01)

(56) References Cited

U.S. PATENT DOCUMENTS

| | | | |
|---|---|---|---|
| 2006/0004728 A1 | 1/2006 | Gotoh | |
| 2006/0122915 A1* | 6/2006 | Allen | G06T 19/00 |
| | | | 705/26.1 |
| 2013/0275411 A1 | 10/2013 | Kim et al. | |
| 2014/0250120 A1 | 9/2014 | Mei et al. | |
| 2015/0294185 A1* | 10/2015 | Cady | G06F 16/5866 |
| | | | 382/195 |
| 2016/0147792 A1* | 5/2016 | Oh | G06F 21/30 |
| | | | 707/723 |
| 2016/0203194 A1 | 7/2016 | Park et al. | |

FOREIGN PATENT DOCUMENTS

| | | | | |
|---|---|---|---|---|
| KR | 10-2016-0013496 A | 2/2016 | | |
| KR | 10-2016-0086090 A | 7/2016 | | |
| WO | PCT/WO2015/005728 | * | 1/2015 | G06F 3/14 |

OTHER PUBLICATIONS

The future of the world is driven by text recognition, not 'AR image recognition'; 7 pages; http://www.edaily.co.kr/news/read?newsId=02958666612751256&mediaCodeNo=257.

Yeong-Il Mo, Cheol-Gyu Lee; A Study on Increasing the Efficiency of Image Search Using Image Attribute in the area of content-Based Image Retrieval; 11 pages; http://www.dbpia.co.kr/Journal/ArticleDetail/NODE01216769.

Plkemon Go' fever AR .VR based game . . . When will Korea be released?; 5 pages; http://www.ebn.co.kr/news/view/840818.

* cited by examiner

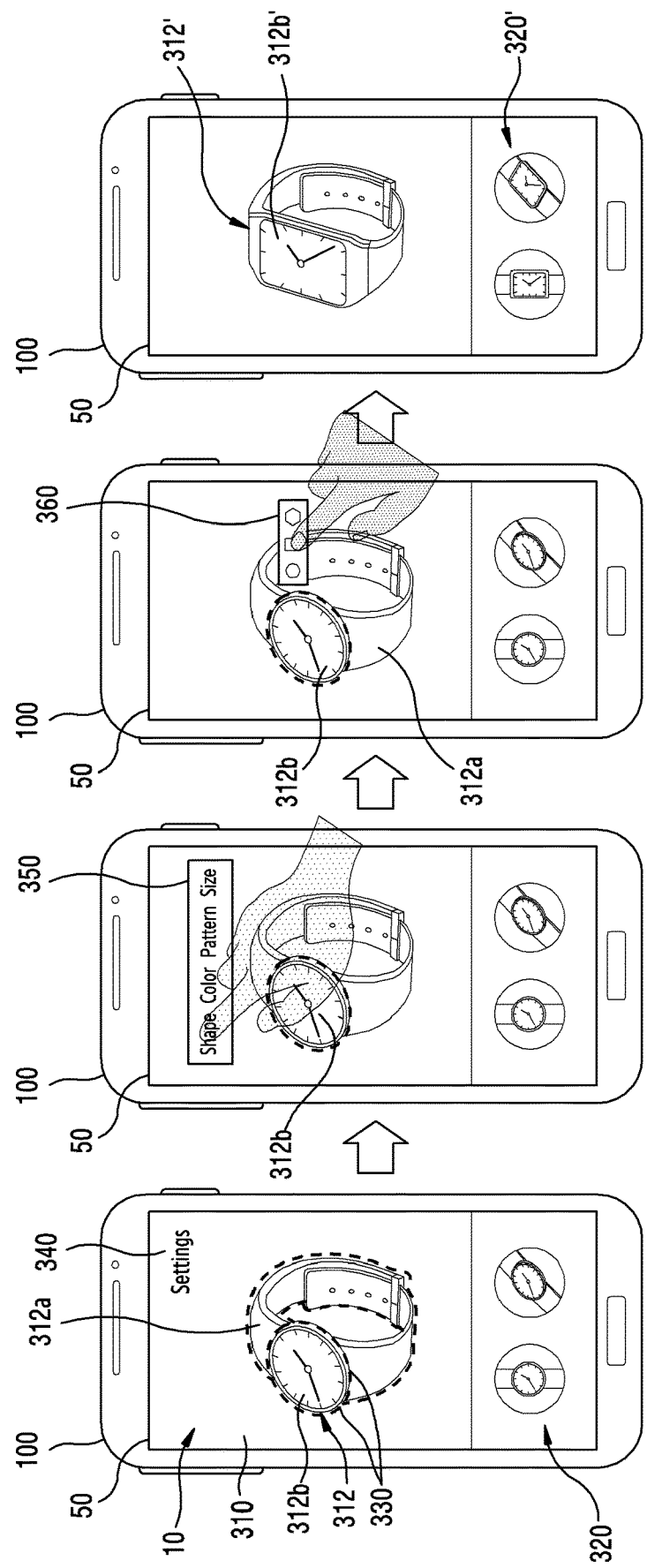

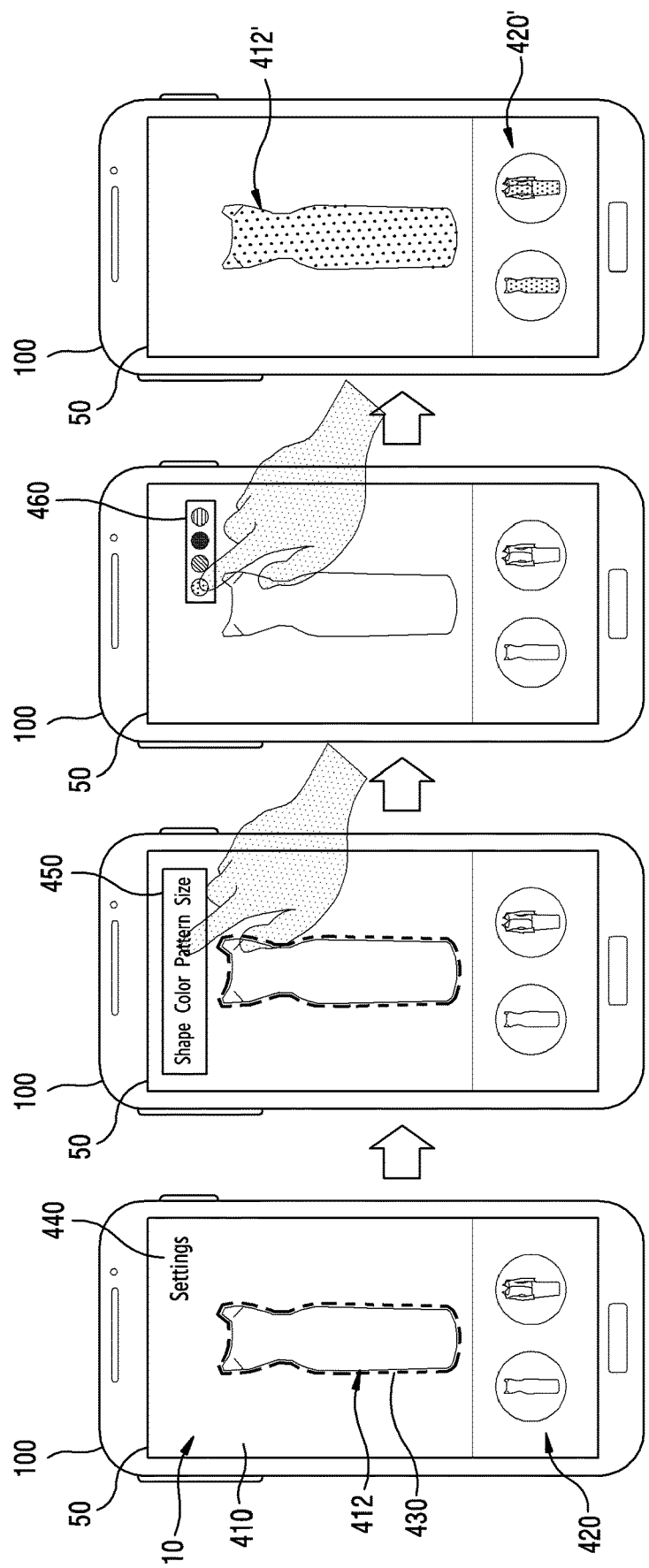

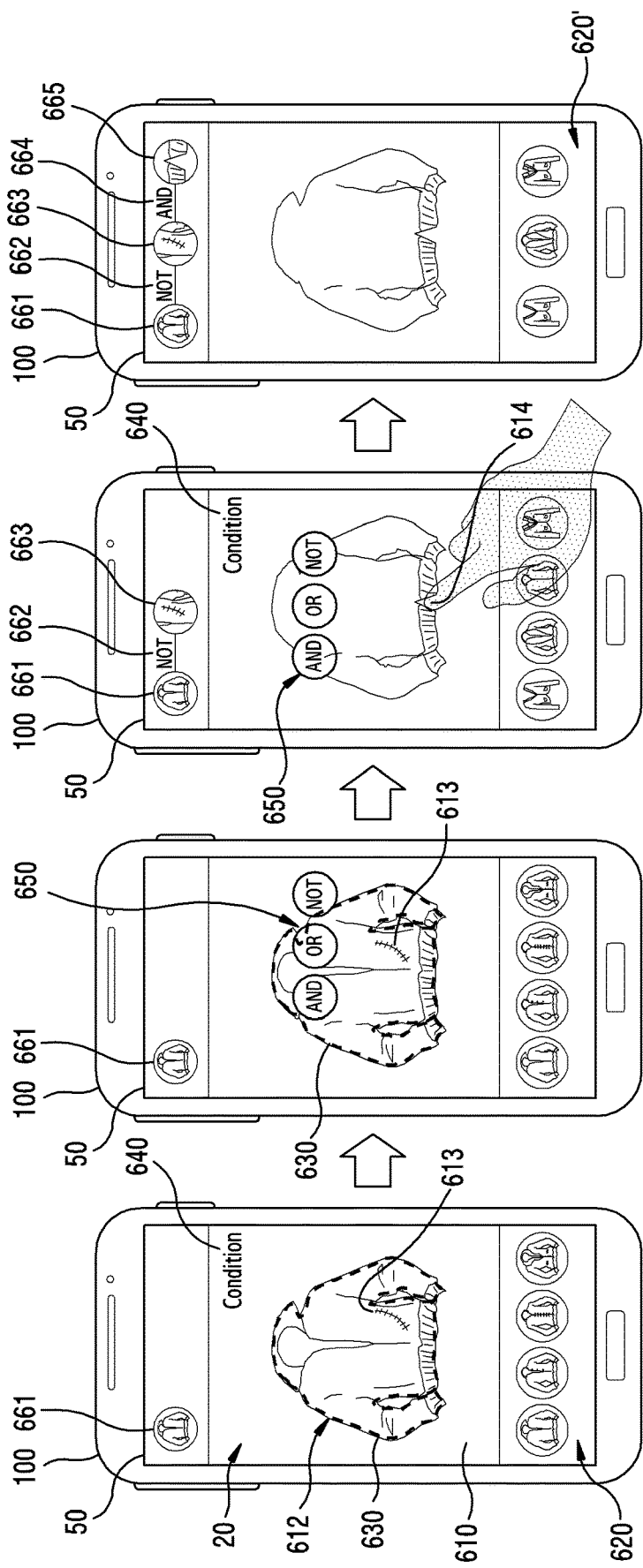

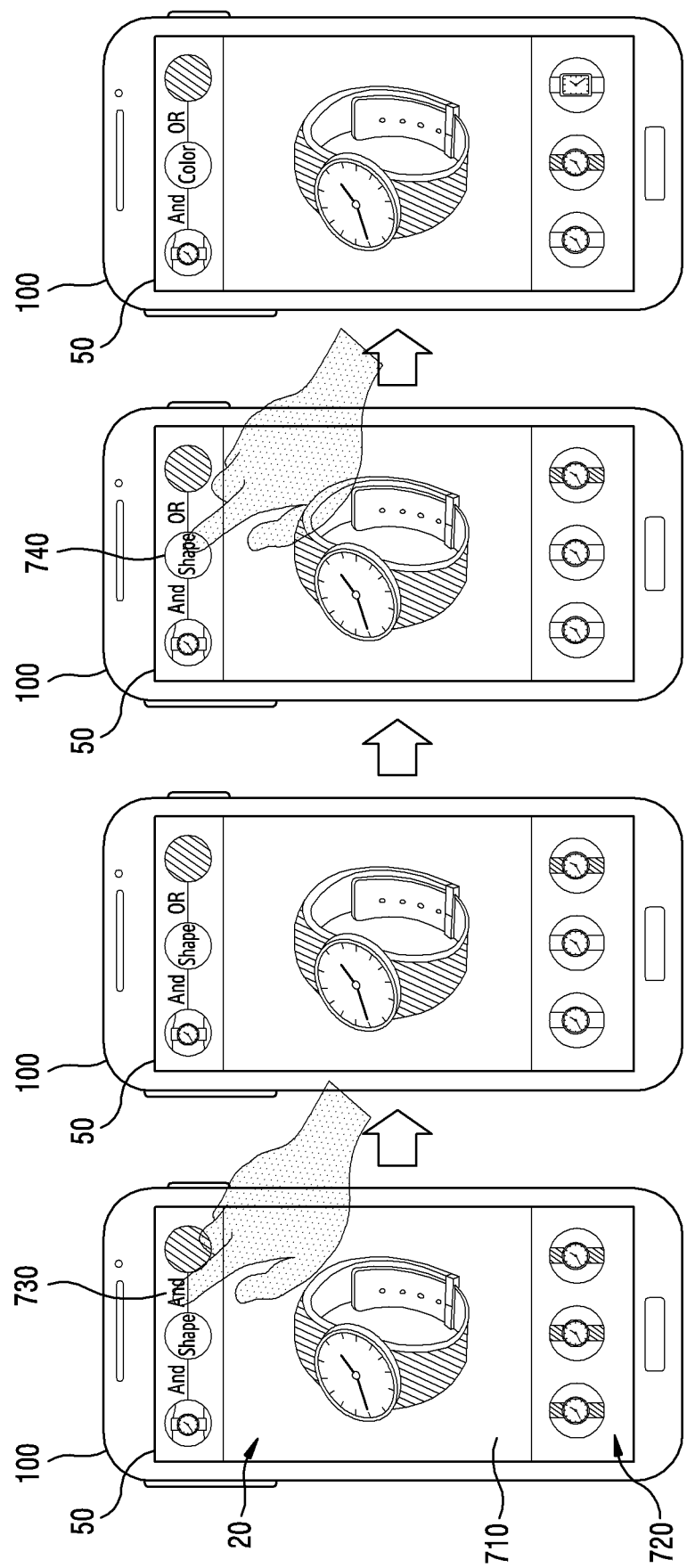

ELECTRONIC APPARATUS, AND METHOD FOR CONTROLLING SAME

CLAIM OF PRIORITY

This application is a National Phase Entry of PCT International Application No. PCT/KR2017/014270, which was filed on Dec. 7, 2017, and claims a priority to Korean Patent Application No. 10-2017-0010304, which was filed on Jan. 23, 2017, the contents of which are incorporated herein by reference.

TECHNICAL FIELD

Various embodiments of the disclosure relate to a method for searching an image by using an image, and more particularly, to an electronic device which deforms an image and then searches an image similar to the deformed image, and a control method thereof.

BACKGROUND ART

As functions provided by electronic devices such as smartphones have become diversified, users can perform various functions such as replaying video files, taking pictures or making videos, or playing games by using electronic devices. In addition, users can be provided with search services by accessing web servers by using electronic devices. For example, when a user enters a search term and a search condition, a web server can provide a result of searching according to the search term and the search condition by using a search engine.

The search engine may include, for example, a word search engine, a subject search engine, a meta search engine, or the like. The result of searching may be provided in the form of a text or an image.

DISCLOSURE OF INVENTION

Technical Problem

When a user uses a search service, the user may not well remember search terms for finding a result of searching. In particular, when a user wishes to find an image as a result of searching, the user may have difficulty in finding a search time related to an image.

In particular, when a user finds the product that the user wants on an online shopping mall, the user may have difficulty in searching the product based on an image because even the same images may have partially different components.

Accordingly, various embodiments of the disclosure provide a method for enabling a user to find a desired image easily and rapidly by allowing the user to deform a part of an image when searching, or to set a search condition with respect to a plurality of images.

Solution to Problem

An electronic device according to an embodiment may include a display, a communication module, and a processor electrically connected with the display and the communication module, and the processor may be configured to control to: recognize an object detected in an image displayed on the display, and distinguish at least one component contained in the object; change an attribute of the component based on a user input; and transmit an image the attribute of which is changed to another electronic device by using the communication module, and to receive an image searched as an image similar to the image containing the object the attribute of which is changed and to display the image on the display.

A control method of an electronic device which includes a display and a communication module according to an embodiment may include: displaying an image on the display; recognizing an object detected in the image, and distinguishing at least one component contained in the object; changing an attribute of the component based on a user input; and transmitting an image the attribute of which is changed to another electronic device by using the communication module, and receiving an image searched as an image similar to the image containing the object the attribute of which is changed and displaying the image on the display.

Advantageous Effects of Invention

According to various embodiments of the disclosure as described above, a user can deform an image displayed on an electronic device, and can rapidly search a desired image.

In addition, the user can select some components from a plurality of images, and select a search condition, and can search a desired image.

Other effects that can be obtained or predicted by an embodiment of the disclosure will be directly or indirectly disclosed in detailed description of embodiments of the disclosure. In other words, various effects that can be predicted according to an embodiment of the disclosure will be disclosed in detailed description which will be described below.

BRIEF DESCRIPTION OF DRAWINGS

FIG. 3 illustrates views to explain a situation in which a shape of an object is changed and a similar image is searched in an electronic device according to various embodiments;

FIG. 4 illustrates views to explain a situation in which a pattern of an object is changed and a similar image is searched in an electronic device according to various embodiments;

FIG. 6 illustrate views to explain another situation in which a search condition is set in an electronic device according to an embodiment;

FIG. 7 illustrate views to explain a situation in which a search condition is changed in an electronic device according to an embodiment;

BEST MODE FOR CARRYING OUT THE INVENTION

Figure 1A:
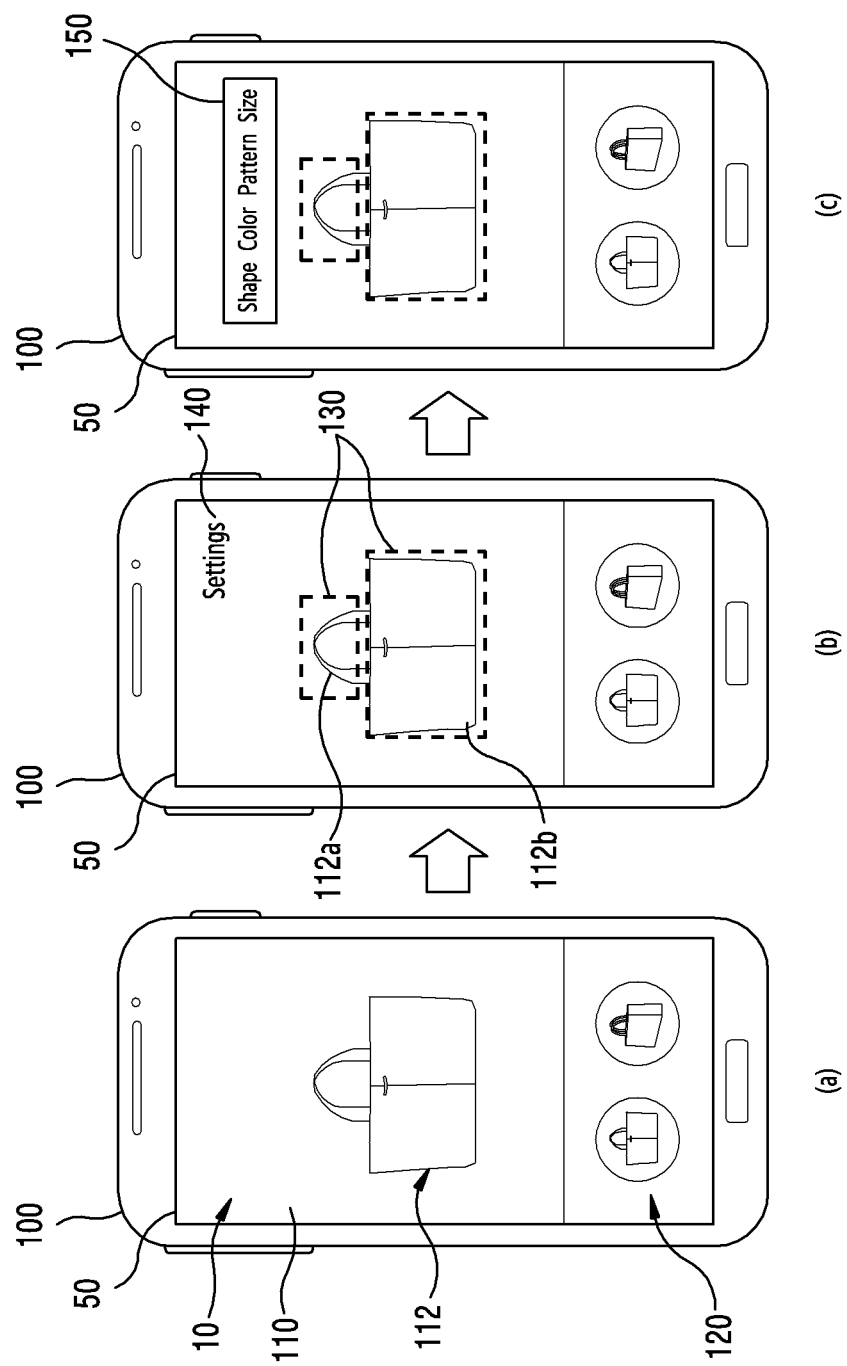
FIGS. 1A to 1C are views to explain a situation in which an electronic device according to an embodiment recognizes an object included in an image by distinguishing a component, and searches an image similar to the object.

Various embodiments of the present disclosure are described with reference to the accompanying drawings. The terms used herein is not intended to limit various embodiments of the present disclosure to the particular forms disclosed herein, and should be understood that the present disclosure may comprise modifications, equivalents, and/or alternatives of corresponding embodiments. The same or similar components may be designated by the same or similar reference numerals although they are illustrated in different drawings. It is to be understood that the singular forms "a," "an," and "the" also include plural referents unless the context clearly dictates otherwise. In the present disclosure, an expression such as "A or B," "at least one of A and B" or "at least one of A or B" may include all possible combinations of the listed items. Expressions such as "first," "second," "primarily," or "secondary," as used herein, may represent various elements regardless of order or importance, and do not limit the corresponding elements. The expressions may be used for distinguishing one element from another element. When it is described that an element (such as a first element) is operatively or communicatively "coupled to" or "connected to" another element (such as a second element), the element may be directly connected to the other element or may be connected through another element (such as a third element).

The expression "configured (or set) to", as used in the present disclosure, may be used interchangeably with, for example, "suitable for," "having the capacity to," "adapted to," "made to," or "capable of," or "designed to", according to the situation. In some situations, the expression "apparatus configured to" may refer to a situation in which the apparatus "may" operate together with another apparatus or component. The phrase "a processor configured (or set) to perform A, B, and C" may be a dedicated processor (such as an embedded processor) for performing a corresponding operation, or a general-purpose processor (such as a central processing (CPU) or an application processor (AP)) that may perform a corresponding operation by executing at least one software program stored in a memory device.

An electronic device, according to an embodiment of the present disclosure, may be for example, at least one of a smart phone, a tablet PC, a mobile phone, a video phone, an e-book reader, a desktop PC, a laptop PC, a notebook computer, a workstation, a server, a PDA, a portable multimedia player (PMP), an MPEG 3 (MP3) player, medical equipment, a camera, and a wearable device, and the like, but is not limited thereto. The wearable device may include at least one of an accessory type (e.g., a watch, a ring, a bracelet, an ankle bracelet, a necklace, eyeglasses, a contact lens, or a head-mounted-device (HMD)), a fabric or clothing embedded type (e.g., electronic garments), a body attachable type (e.g., a skin pad or a tattoo), and an implantable circuit, and the like, but is not limited thereto. The electronic device may be at least one of, for example, a television, a digital versatile disc (DVD) player, an audio device, a refrigerator, an air-conditioner, a cleaner, an oven, a microwave oven, a washing machine, an air cleaner, a set-top box, a home automation control panel, a security control panel, a media box (e.g., samsung HomeSync™, apple TV™, google TV™), a game console (Xbox™, PlayStation™), an electronic dictionary, an electronic key, a camcorder, and an electronic frame.

Figure 1B:
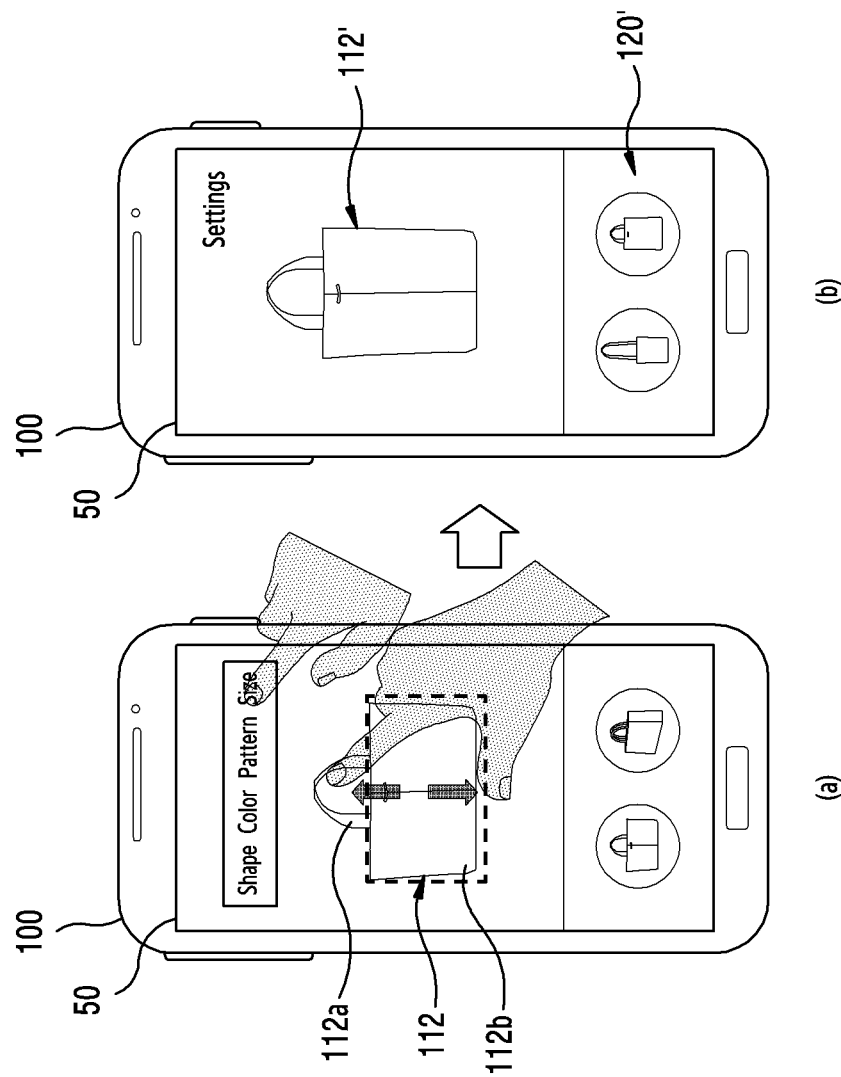
Figure 1C:
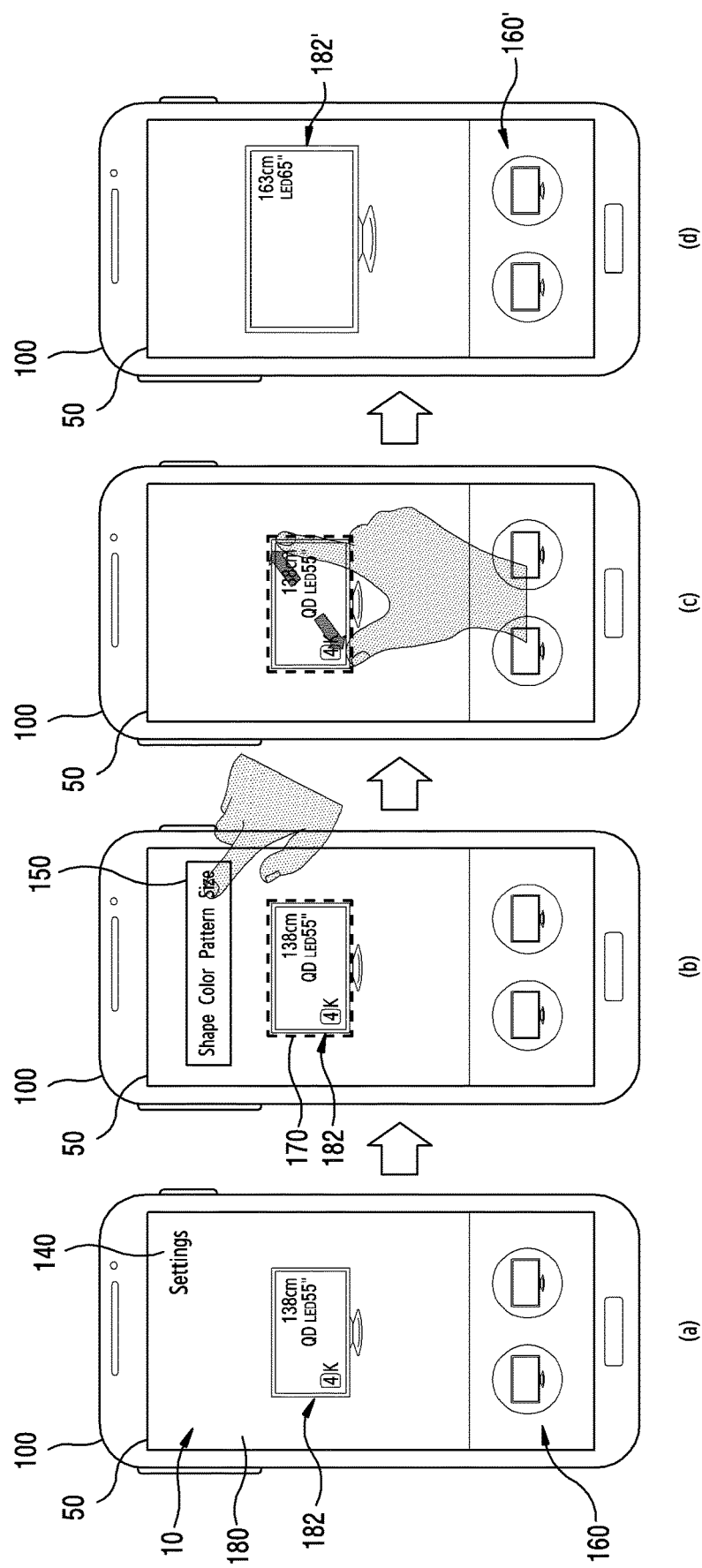

FIGS. 1A to 1C are views to explain a situation in which an electronic device according to an embodiment recognizes an object included in an image by distinguishing a component, and searches an image similar to the object.

Referring to FIG. 1A, the electronic device 100 may include at least one of electronic devices 100 including displays, such as a smartphone, a tablet PC, a desktop PC, a camera, or a wearable device, as described above.

Referring to view (a) of FIG. 1A, the electronic device 100 may execute a search application using an image based on an input of a user, and may display a first user interface 10 on a display 50. The first user interface 10 may include, for example, an image that the user wishes to search, a searched image, and icons for searching. The search application using the image may be, for example, a search application for finding a product to purchase on an online shopping mall. The display 50 may include a touch screen, and may receive a touch, a gesture, an approach, or a hovering input using an electronic pen or a part of the user's body.

For example, the electronic device 100 may activate a camera function when executing the search application using the image. The electronic device 100 may display an image 110 generated based on an image inputted through a camera module (not shown) on the display 50.

According to various embodiments, the electronic device 100 may activate a gallery application when executing the search application using the image. The electronic device 100 may display an image 110 selected in the gallery application on the display 50.

The electronic device 100 according to an embodiment may recognize an object in the image 110 displayed on the display 50. For example, the electronic device 100 may recognize a bag 112 included in the image 110. The electronic device 100 may deform the displayed image 110 into an image highlighting an edge component, and may detect a shape of the bag 112 included in the image 110.

The electronic device 100 may compare the shape of the object detected and a plurality of images stored in a database. For example, the electronic device 100 may compare the shape of the image detected and a plurality of images stored in a database stored in a memory (not shown) provided in the electronic device 100. In addition, the electronic device 100 may transmit the displayed image to other external electronic devices by using a communication module (not shown), and may receive, from the other electronic devices, results of comparing the shape of the object included in the image and a plurality of images stored in databases of the other electronic devices.

The electronic device 100 may display an image having a shape and a color similar to those of the detected object on the display 50. For example, the electronic device 100 may display bag images 120 having shapes and colors similar to those of the bag 112 detected in the image 110 on the display 50. Referring to view (a) of FIG. 1A, the electronic device 100 may display the searched bag images 120 on a lower end of the display 50. However, a position where the searched bag images 120 are displayed is not limited thereto.

According to an embodiment, when the searched bag images 120 are greater than or equal to a predetermined number, the electronic device 100 may display only some of the bag images, and may display the other bag images on the display 50 in sequence based on a touch and drag input of the user, for example.

According to an embodiment, the electronic device 100 may set a search category based on the result of recognition. For example, when the electronic device 100 recognizes the bag 112 in the image 110, the electronic device 100 may set "bag" as the search category. Thereafter, the electronic device 100 may search and display only images related to "bag" during a repeated search.

According to various embodiments, the user may directly set the search category of the electronic device 100. For example, the user may enter a search category after executing the search application using the image. For example, the user may set the search category to normal products, home appliances (electronics), fashion products (style), or the like. When the user sets the search category, the electronic device 100 can enhance a search speed and the accuracy of search.

According to an embodiment, the electronic device 100 may differently set a method for searching a similar image according to a search category. For example, the electronic device 100 may differently set a method for searching a similar image according to a category generated by using a result of detecting in an image, or a category inputted by the user.

For example, the electronic device 100 may search a similar image by using an Oriented FAST and Rotated BRIEF (ORB) algorithm for image matching with respect to normal products. In addition, the electronic device 100 may search a similar image by using a convolutional neural network (CNN) method, which is one of the deep-learning methods, with respect to home appliances (electronics) and fashion products (style).

Referring to views (a) and (b) of FIG. 1A, the electronic device 100 may detect an object in an image displayed on the display 50, and may search and display an image including an object similar to the detected object, and simultaneously or serially, may distinguish at least one component included in the detected object. The component may be each of the parts constituting the object, for example. The component may include a first component and a second component. For example, when the object is a bag, the first component may correspond to a body 112b of the bag, and the second component may correspond to a handle 112a of the bag. However, this should not be considered as limiting.

The electronic device 100 may distinguish the components included in the detected object by using a method similar to the method of searching the image similar to the image displayed on the display 50. For example, the electronic device 100 may convert the image displayed on the display 50 into an image highlighting an edge, and may distinguish components included in the detected object by using a database stored in the memory (not shown) provided therein or databases of other external electronic devices.

According to various embodiments, the user may directly input the components included in the object displayed on the display 50. For example, when the electronic device 100 includes a display supporting a touch, the user may select a component by touching the component of the object displayed on the display 50, or by forming a looped curve to identify the component of the object by using a touch and drag method.

The electronic device 100 may display the distinguished component on the display 50. Referring to view (b) of FIG. 1A, the electronic device 100 may display an identifier 130 (for example, a dashed box) for distinguishing the handle 112a and the body 112b with respect to the detected bag 112.

Referring to views (b) and (c) of FIG. 1A, the user may change shapes, colors, sizes, patterns, etc. of the components included in the object, and then may search a similar image. For example, the electronic device 100 may display a first item 150 displaying changeable attributes, such as a shape, a color, a pattern, a size, etc., based on a user input of selecting a "setting" 140 icon (or menu).

The user may select an attribute that the user wishes to change from the attributes included in the first item 150 displayed on the display 150. In addition, the user may select a component that the user wishes to change from the components included in the object displayed on the display 50.

Referring to view (a) of FIG. 1B, the user may select the "size" attribute and may select the body 112b from the components of the bag 112, and may change the size thereof. For example, the user may increase a vertical length of the body 112b by touching an upper end and a lower end of the body 112b and dragging in the opposite directions.

According to an embodiment, the electronic device 100 may display a portion regarding the changed attribute on the display 50 by using augmented reality (AR) technology. The AR may be technology that shows one image by superimposing a three-dimensional virtual image on a real image or background.

According to an embodiment, to use an AR function, the electronic device 100 may obtain information regarding the position and posture of the electronic device 100 by using a global positioning system (GPS) device, which receives and transmits geography, location information, or by using a gravity sensor, a gyro sensor, or an acceleration sensor, which detects the slope, posture, direction, or the like of the electronic device 100.

In addition, the electronic device 100 may set a network with an information system in which information regarding buildings according geography or location, or detailed information regarding products is stored, and may receive detailed information regarding an inputted image, and may display a currently inputted image and detailed information on the display 50 by using an AR application.

Referring to view (b) of FIG. 1B, the electronic device 100 may display a bag 112' having the size of the body 112b changed on the display 50. According to an embodiment, the electronic device 100 may superimpose information regarding the changed attribute on the bag 112' having the size of the body 112b changed by using the above-described AR technology, and may display the bag.

Referring to view (b) of FIG. 1B, the electronic device 100 may search images 120' similar to the bag 112' whose body is enlarged, and may display the images on the display 50. For example, the electronic device 100 may search images similar to the image displayed on the display 50 by using internal and external databases, and may display the similar images 120' on a lower end of the display 50.

Since the electronic device 100 according to an embodiment sets the search category to "bag" as described above in view (a) of FIG. 1A, the search regarding the bag 112' having the body 112b enlarged may be limited to the "bag" category described above. Accordingly, when one of the components of the bag 112 included in the image 110 is changed and a search is made, user's intention may be reflected, such that the accuracy can be higher than the result of searching the image similar to the initial bag, and a search having high similarity can be made.

FIG. 1C illustrate views to explain another embodiment for changing a size of an object and searching a similar image in an electronic device according to an embodiment.

Referring to view (a) of FIG. 1C, the electronic device 100 may execute a search application using an image based on an input of a user, and may display a first user interface 10 on the display 50. The search application using the image may be, for example, a search application for finding a product to purchase on an online shopping mall.

The electronic device 100 according to an embodiment may activate a camera function when executing the search application using the image, and may display an image 180 generated based on an inputted image on the display 50.

The electronic device 100 according to an embodiment may recognize an object in the image 180 displayed on the display 50. For example, the electronic device 100 may recognize a TV 182 included in the image 180. For example, the electronic device 100 may deform the displayed image 180 into an image highlighting an edge component, and may detect a shape of the TV 182 included in the image 180.

The electronic device 100 may compare the shape of the image detected and a plurality of images stored in a database stored in a memory (not shown) provided in the electronic device 100. In addition, the electronic device 100 may compare the shape of the object detected and a plurality of images stored in databases of other external electronic devices by using a communication module (not shown).

The electronic device 100 according to an embodiment may display TV images 160 having shapes and colors similar to those of the TV 182 detected in the image 180 on the display 50. Referring to view (a) of FIG. 1C, the electronic device 100 may display the searched TV images 160 on a lower end of the display 50.

According to an embodiment, the electronic device 100 may display information regarding the detected TV 182 on the display 50 by using augmented reality (AR) technology. For example, the electronic device 100 may superimpose information regarding the size, resolution, or the like of the TV on the TV 182, and may display the TV.

Referring to views (a) and (b) of FIG. 1C, the electronic device 100 may detect an object in the image 180 displayed on the display 50, and may search and display an image including an object similar to the detected object, and simultaneously or serially, may distinguish components included in the detected object.

The electronic device 100 may display the distinguished component on the display 50. Referring to view (b) of FIG. 1C, the electronic device 100 may display an identifier 170 distinguishing the detected TV 182 from surroundings.

Referring to views (a) to (c) of FIG. 1C, the user may change the shapes, colors, sizes, etc. of the components of the object and then may search a similar image. For example, the electronic device 100 may display a first item 150 displaying changeable attributes, such as a shape, a color, a pattern, a size, etc., based on a user input of selecting the "setting" 140 icon.

The user may select an attribute that the user wishes to change from the attributes included in the displayed first item 150. In addition, the user may select a component that the user wishes to change from the components included in the object displayed on the display 50.

Referring to views (b) and (c) of FIG. 1C, the user may select the "size" attribute and may change the size of the TV 182 included in the image 180. For example, the user may change the size of the TV 182 by touching one side and the other side of the TV 182 displayed on the display 50 and dragging in the opposite directions.

According to an embodiment, the electronic device 100 may display a portion regarding the changed attribute on the display 50 by using augmented reality (AR) technology. For example, referring to view (d) of FIG. 1C, the electronic device 100 may display a TV 182' whose size is changed on the display 50. According to an embodiment, the electronic device 100 may display the TV 182' whose size is changed by using AR technology.

According to an embodiment, the electronic device 100 may search information regarding the TV 182' whose size is changed, based on a ratio at which the size is changed. For example, the electronic device 100 may identify a difference in size between the TV 182 included in the image 180 displayed on the display 50 in view (a) of FIG. 1C, and the TV 182' whose size is changed, included in the image displayed on the display 50 in view (d) of FIG. 1C.

For example, the electronic device 100 may identify that the display size of the TV 182 included in the image 180 displayed on the display 50 in view (a) of FIG. 1C is 138 cm. By using this information, the electronic device 100 may derive (or infer or predict) that the display of the TV 182' whose size is changed, included in the image displayed on the display 50 in view (d) of FIG. 1C, is 163 cm, and may search a TV similar thereto and display the TV on the display 50. For example, the electronic device 100 may derive that the display of the TV 182' whose size is changed is 163 cm by using a ratio between a diagonal length of the TV 182 included in the image 180 and a diagonal length of the TV 182' whose size is changed.

Referring to view (d) of FIG. 1C, the electronic device 100 may search images 160' (for example, TV images having similar sizes) similar to the TV 182' whose size is changed, and may display the images on the display 50. As described above, the electronic device 100 may search an image similar to the image displayed on the display 50 by using internal and external databases.

As described above, the electronic device 100 may search an image similar to an object included in an image inputted by using a search application using an image. In addition, the electronic device 100 may distinguish components included in the object included in the inputted image, and provide a user interface for changing each of the components, such that the user can easily change the image and search a desired image.

In particular, when the search application using the image is a search application for finding a product to purchase on an online shopping mall, the user can easily search a product to search, while changing at least one of attributes, such as a shape, a size, a color, a pattern, etc., of an image photographed or an image currently inputted through a camera module.

In addition, the electronic device 100 may perform an additional search hierarchically by limiting to a set category, such that the probability of finding a product desired by the user increases as the user repeats the above-described search.

Figure 2:
FIG. 2 is a schematic block diagram of an electronic device according to an embodiment.

FIG. 2 is a schematic block diagram of an electronic device according to an embodiment.

Referring to FIG. 2, the electronic device 200 (for example, the electronic device 100) according to an embodiment may include a display 210 (for example, the display 50 of FIG. 1), a processor 220, and a communication processor 230. However, the electronic device 200 may be implemented to include more elements or fewer elements than the elements illustrated in FIG. 2. For example, the electronic device 200 may include an element such as an input module (for example, a physical key, a proximity sensor, a biometric sensor, or the like) or a power supply.

The display 210 may include, for example, a liquid crystal display (LCD), a light emitting diode (LED) display, an organic LED (OLED) display, or a microelectromechanical system (MEMS) display, or an electronic paper display. The display 210 may include the display 50 of FIG. 1A. The display 210 may include a touch screen, and for example, may receive a touch, a gesture, an approach, or a hovering input using an electronic pen or a part of the user's body.

The processor 220 may control a plurality of hardware or software elements connected to the processor 220 by driving an operating system or an application program, and may perform various data processing and operations.

The processor 220 according to an embodiment may control a first user interface pre-stored in a memory (not shown) to be displayed on the display 210. However, this should not be considered as limiting. For example, the processor 220 may control to receive a user interface stored in another external electronic device or a server through the communication module 230, and to display the user interface on the display 210.

The communication module 230 may include, for example, a cellular module, a WiFi module, a Bluetooth module, an RF module, or the like. The communication module 230 may form a network with other external electronic devices under the control of the processor 220.

According to an embodiment, the processor 220 may control to include an image in the first user interface and to display the first user interface on the display 210. The processor 220 may control to display an image by using an image inputted through a camera module (not shown), or to display an image stored in a memory (not shown) on the display 210.

The processor 220 may detect an object included in the image, and may distinguish components included in the object. The processor 220 may search an image similar to the detected object. The processor 220 may control to search an image similar to the detected object from among images stored in the other external electronic devices by using the communication module 230, and to display the similar image on the display 210.

In addition, the processor 220 may control to distinguish the components of the object and to display the components on the display 210. The processor 220 may control the display 210 to superimpose a changed attribute on the image and display the image, based on a signal input of changing an attribute (for example, a shape, a size, a color, a pattern, etc.) of at least one of the components. For example, the processor 220 may control the display 210 to superimpose the changed attribute on the image and display the image by using AR technology.

According to an embodiment, the processor 220 may control to search an image similar to the object whose attribute is changed, and to display the similar image on the display 210. The processor 220 may control to search an image similar to the object whose attribute is changed from among images stored in the other external electronic devices by using the communication module 230, and to display the similar image on the display 210.

Hereinafter, various embodiments of the disclosure will be described by taking the electronic device 100 for example for convenience of explanation. However, various embodiments described below may be equally applied to the electronic device 200 of FIG. 2.

FIG. 3 illustrates views to explain a situation in which a shape of an object is changed and a similar image is searched in an electronic device according to an embodiment.

Referring to view (a) of FIG. 3, the electronic device 100 may execute a search application using an image based on an input of a user, and may display a first user interface 10 on the display 50. The search application using the image may be a search application for finding a product to purchase on an online shopping mall, for example.

The electronic device 100 according to an embodiment may activate a camera function when executing the search application using the image, and may display an image 310 generated based on an inputted image on the display 50.

The electronic device 100 according to an embodiment may recognize an object in the image 310 displayed on the display 50. For example, the electronic device 100 may recognize a watch 312 included in the image 310. For example, the electronic device 100 may deform the displayed image 310 into an image highlighting an edge component, and may detect a shape of the watch 312 included in the image 310.

For example, the electronic device 100 may compare the shape of the object detected and a plurality of images stored in a database stored in a memory (not shown) provided in the electronic device 100. In addition, the electronic device 100 may compare the shape of the object detected and a plurality of images stored in databases of other external electronic devices by using a communication module (not shown).

The electronic device 100 according to an embodiment may display watch images having shapes and colors similar to those of the watch 312 detected in the image 310 on the display 50. Referring to view (a) of FIG. 3, the electronic device 100 may display the searched watch images 320 on a lower end of the display 50.

Referring to views (a) and (b) of FIG. 3, the electronic device 100 may detect an object in the inputted image 310, and may search and display an image including an object similar to the detected object, and simultaneously or serially, may distinguish components included in the detected object.

The electronic device 100 may display the distinguished components on the display. Referring to view (a) of FIG. 3, the electronic device 100 may display an identifier 330 distinguishing a strap 312a and a body 312b with respect to the detected watch 312.

Referring to views (a) and (b) of FIG. 3, the user may change shapes, patterns, colors, sizes, etc. of the components of the object, and then may search similar images. For example, the electronic device 100 may display a first item 350 displaying changeable attributes such as a shape, a color, a pattern, a size, etc. based on a user input of selecting a "setting" 340 icon.

The user may select an attribute that the user wishes to change from the attributes included in the displayed first item 350. In addition, the user may select a component that the user wishes to change from the components included in the object displayed on the display.

Referring to views (b) and (c) of FIG. 3, the user may select the "shape" attribute and may select the body 312b from the components of the watch 312, and may change the shape of the body. For example, when the user selects the "shape" attribute and selects the body 312b of the watch 312, the electronic device 100 may display a second item 360 including types of shapes to which the component is changeable on the display 50.

The user may select one of the various types of shapes displayed on the second item 360. The electronic device 100 may change the body 312b based on the type of shape selected by the user, and may display the changed body on the display 50.

According to another embodiment, the user may directly change the shape of the watch body 312b. For example, the electronic device 100 may change the shape of the body 312b based on a user input of touching an exterior of the body 312b and dragging, and may display the changed body on the display 50.

According to an embodiment, the electronic device 100 may display a portion regarding the changed attribute on the display 50 by using augmented reality (AR) technology. For example, the electronic device 100 may generate a rectangular watch body 312b' and may superimpose the body 312b' on the body 312b of the watch 312 by using AR technology.

Referring to view (d) of FIG. 3, the electronic device 100 may search images 320' similar to the watch 312' whose body is changed to a rectangle, and may display the similar images on the display 50. As described above, the electronic device 100 may search images similar to the image displayed on the display 50 by using internal and external databases.

FIG. 4 illustrates views to explain a situation in which a pattern of an object is changed and a similar image is searched in an electronic device according to an embodiment.

Referring to view (a) of FIG. 4, the electronic device 100 may execute a search application using an image based on an input of a user, and may display a first user interface 10 on the display 50. The search application using the image may be a search application for finding a product to purchase on an online shopping mall, for example.

The electronic device 100 according to an embodiment may activate a camera function when executing the search application using the image, and may display an image 410 generated based on an inputted image on the display 50.

The electronic device 100 according to an embodiment may recognize an object in the image 410 displayed on the display 50. For example, the electronic device 100 may recognize a dress 412 included in the image 410. For example, the electronic device 100 may deform the image 410 displayed on the display 50 into an image highlighting an edge component, and may detect a shape of the dress 412 included in the image 410.

For example, the electronic device 100 may compare the shape of the object detected and a plurality of images stored in a database stored in a memory (not shown) provided in the electronic device 100. In addition, the electronic device 100 may compare the shape of the object detected and a plurality of images stored in databases of other external electronic devices by using a communication module (not shown).

The electronic device 100 according to an embodiment may display dress images 420 having shapes and colors similar to those of the dress 412 detected in the image 410 on the display 50. Referring to view (a) of FIG. 4, the electronic device 100 may display the searched watch images 420 on a lower end of the display 50.

Referring to view (a) of FIG. 4, the electronic device 100 may detect the dress 412 in the inputted image 410, and may search and display an image including a dress similar to the detected dress 412, and simultaneously or serially, may distinguish components included in the detected dress 412.

The electronic device 100 may display the distinguished components on the display 50. Referring to view (a) of FIG. 4, the electronic device 100 may display an identifier 430 distinguishing the detected dress 412 from surroundings.

Referring to views (a) and (b) of FIG. 4, the user may change shapes, patterns, colors, sizes, etc. of the components of the object, and then may search similar images. For example, the electronic device 100 may display a first item 450 displaying changeable attributes such as a shape, a color, a pattern, a size, etc. based on a user input of selecting a "setting" 440 icon.

The user may select an attribute that the user wishes to change from the attributes included in the displayed first item 450. In addition, the user may select a component that the user wishes to change from the components included in the object displayed on the display 50.

Referring to views (b) and (c) of FIG. 4, the user may select the "pattern" attribute and may change the pattern of the dress 412. For example, when the user selects the "pattern" attribute and selects the dress 412, the electronic device 100 may display a third item 460 including types of patterns to which the dress is changeable on the display 50.

The user may select one of the various types of patterns displayed on the third item 460. The electronic device 100 may change the pattern of the dress 412 based on the type of pattern selected by the user, and may display the changed pattern on the display 50.

According to an embodiment, the electronic device 100 may display a portion regarding the changed attribute on the display 50 by using augmented reality (AR) technology. For example, the electronic device 100 may superimpose and display the pattern on the dress 412 or may superimpose and display a dress 412' in which the pattern is drawn by using AR technology.

Referring to view (d) of FIG. 4, the electronic device 100 may search images 420' similar to the dress 412' in which a predetermined pattern is drawn, and may display the similar images on the display 50. As described above, the electronic device 100 may search images similar to the image displayed on the display 50 by using internal and external databases.

FIG. 5 illustrates views to explain a situation in which a search condition is set in an electronic device according to an embodiment.

Figure 5A:
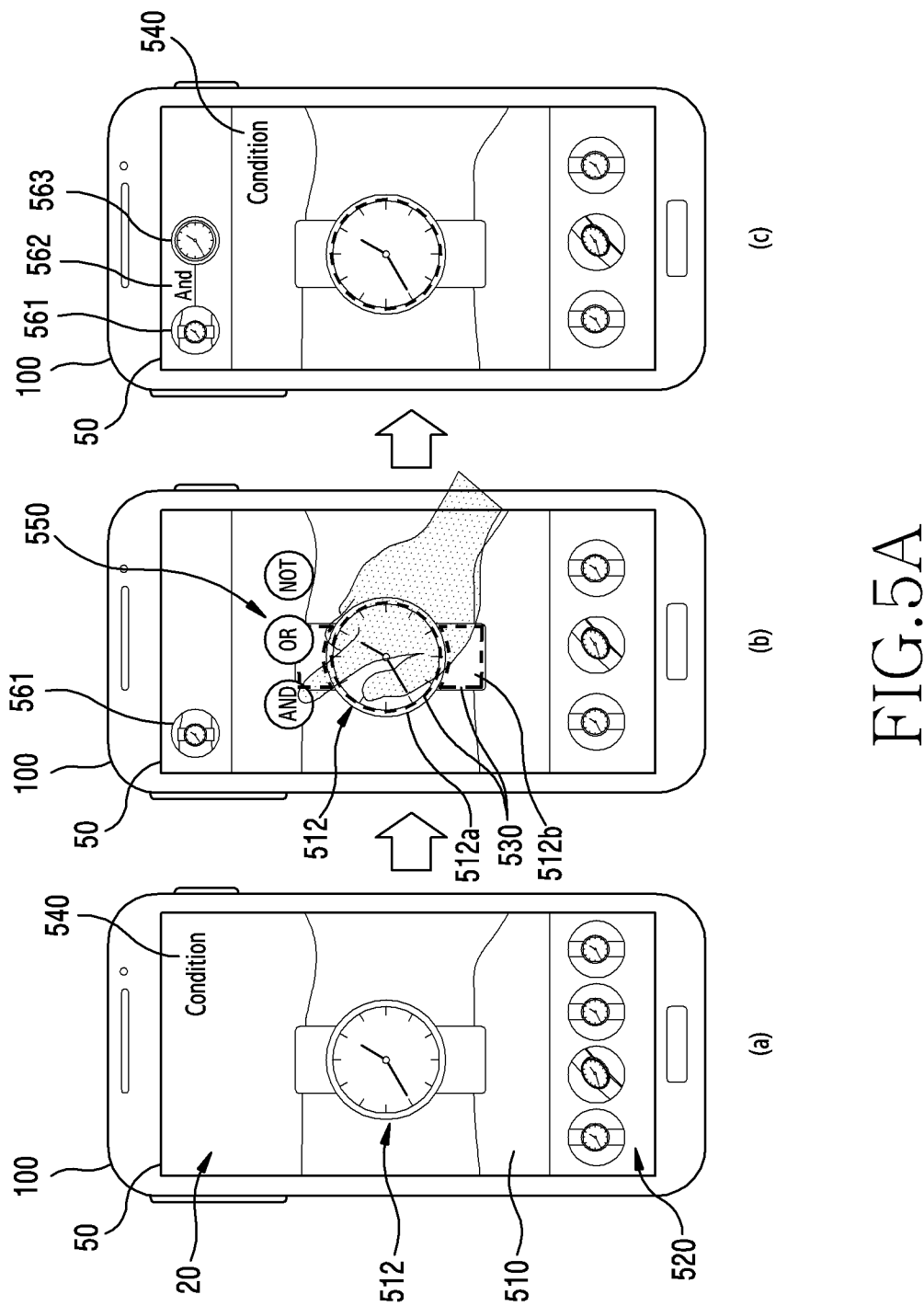
FIGS. 5A and 5B are views to explain a situation in which a search condition is set in an electronic device according to an embodiment.

Referring to view (a) of FIG. 5A, the electronic device 100 may execute a search application using an image based on an input of a user, and may display a second user interface 20 on the display. The second user interface 20 may be, for example, another embodiment of the first user interface 10.

The electronic device 100 according to an embodiment may activate a camera function when executing the search application using the image, and may display an image 510 generated based on an inputted image on the display 50.

The electronic device 100 according to an embodiment may recognize an object in the image 510 displayed on the display 50. For example, the electronic device 100 may recognize a watch 512 included in the image 510. The electronic device 100 may deform the displayed image 510 into an image highlighting an edge component, and may detect a shape of the watch 512 included in the image 510.

The electronic device 100 may compare the shape of the object detected and a plurality of images stored in a database stored in a memory (not shown) provided in the electronic device 100. In addition, the electronic device 100 may compare the shape of the object detected and a plurality of images stored in databases of other external electronic devices by using a communication module (not shown).

According to an embodiment, the electronic device 100 may set a search category based on the result of recognition. For example, when the electronic device 100 recognizes the watch 512 in the image 510, the electronic device 100 may set "watch" as the search category. Thereafter, the electronic device 100 may search and display only images related to "watch" during a repeated search.

The electronic device 100 according to an embodiment may display watch images 520 having shapes and colors similar to those of the watch 512 detected in the image 510 on the display 50. Referring to view (a) of FIG. 5A, the electronic device 100 may display the searched watch images 520 on a lower end of the display 50.

Referring to views (a) and (b) of FIG. 5A, the electronic device 100 may detect the watch 512 in the inputted image 510 and may search and display an image including a watch similar to the detected watch 512, and simultaneously or serially, may distinguish components included in the detected watch 512.

The electronic device 100 may display the distinguished components on the display 50. Referring to view (b) of FIG. 5, the electronic device 100 may display an identifier 530 distinguishing a body 512*a* and a strap 512*b* of the detected watch 512 from surroundings.

Referring to views (a) and (b) of FIG. 5A, the user may combine the shapes, colors, sizes, etc. of the components of the object, and may search a similar image. For example, the electronic device 100 may display a fourth item 550 displaying conditions "AND, OR, NOT" for combining attributes, such as a shape, a color, a pattern, a size, etc., based on a user input of selecting a "condition" 540 icon.

The "AND condition" may refer to a condition in which an image including all of the selected attributes is searched. The "OR condition" may refer to a condition in which an image including at least one of the selected attributes is searched. The "NOT condition" may refer to a condition in which an image without the selected attribute is searched.

The user may select one of the conditions included in the displayed fourth item 550. In addition, the user may select a component to search from the components included in the object displayed on the display.

Referring to views (b) and (c) of FIG. 5A, the user may select the body 512*a* from the components of the watch 512, and may select the "AND condition" from the conditions displayed on the fourth item 550. In response to this, the electronic device 100 may set the watch detected in view (a) of FIG. 5 as the search category, and may display a watch image 561 on an upper end of the display 50. In addition, the electronic device 100 display an image 563 corresponding to the body 512*a* of the watch 512 selected by the user on an upper end of the display 50. The electronic device 100 may display the currently set condition by arranging an image (or text) 562 indicating the "AND condition" selected by the user between the watch image 561 and the image 563 corresponding to the body 512*a*.

Accordingly, the electronic device 100 may search images which are the same as or similar to the body of the watch 512 from among the results of searching in view (a) of FIG. 5A again, and may display the images on the display 50. In this case, the electronic device 100 may not display images having similar straps to the strap 512*b* of the watch 512.

According to an embodiment, the electronic device 100 may combine the plurality of conditions, and may perform the search. To combine the plurality of conditions, the electronic device 100 may display a new image on the display 50, for example.

Figure 5B:
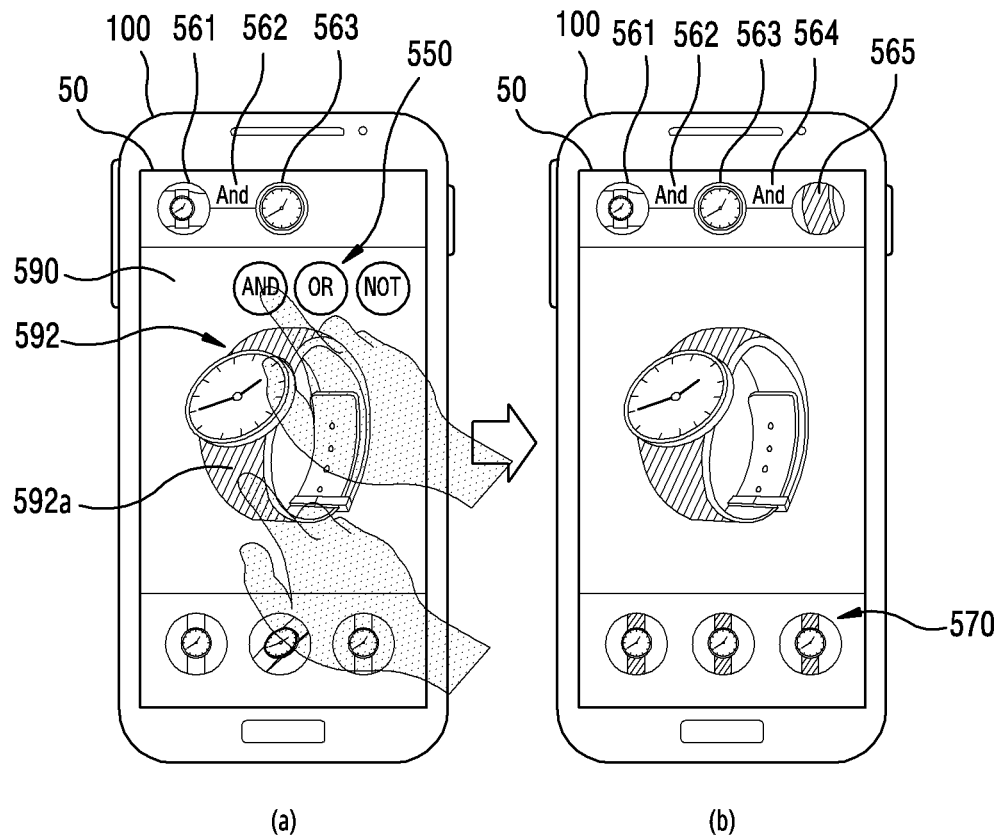

Referring to view (c) of FIG. 5A and view (a) of FIG. 5B, the electronic device 100 may display the image 510 based on the image inputted through the camera module (not shown), based on the user's selecting the "condition" 540 icon. However, this should not be considered as limiting. For example, the electronic device 100 may display a gallery application based on selection of the "condition" 540 icon, and may display an image selected by the user on the display 50.

The electronic device 100 according to an embodiment may display the fourth item 550 displaying the conditions "AND, OR, NOT" for combining the attributes, such as a shape, a color, a pattern, a size, etc., again based on a user input of selecting the "condition" 540 icon.

The user may select one of the conditions included in the displayed fourth items 550. In addition, the user may select a component to search from the components included in the object displayed on the display.

Referring to views (a) and (b) of FIG. 5B, the user may select the "AND condition" from the conditions displayed on the fourth item 550, and may select a strap 592*a* from the components of a watch 592 included in an image 590 displayed on the display 50. The electronic device 100 may display an image 565 corresponding to the selected strap 592*a* on an upper end of the display 50. The electronic device 100 may display the currently set condition by arranging an image (or text) 564 indicating the "AND condition" selected by the user between the image 563 corresponding to the body 512*a* of the watch 512, and the image 565 corresponding to the strap 592*a*.

The electronic device 100 may search watch images 570 having shapes or colors which are the same or similar as or to the shape and color of the body 512*a* of the watch 512 selected in view (b) of FIG. 5A, and as or to the shape and color of the strap 592*a* selected in view (b) of FIG. 5B, and may display the watch images on the display 50.

As described above, according to an embodiment of the disclosure, the user may select attributes of objects included in a plurality of images, may select a desired search condition, and may easily search a desired image.

Although not shown, the user may combine an object whose shape, color, size, etc., is changed with a shape, a color, etc. selected from an object of another image, and may perform the search.

FIG. 6 illustrates views to explain another situation in which a search condition is set in an electronic device according to an embodiment.

Referring to view (a) of FIG. 6, the electronic device 100 may execute a search application using an image based on an input of a user, and may display a second user interface 20 on the display.

The electronic device 100 according to an embodiment may activate a camera function when executing the search application using the image, and may display an image 610 generated based on an inputted image on the display 50.

The electronic device 100 according to an embodiment may recognize an object in the image 610 displayed on the display 50. For example, the electronic device 100 may recognize clothes 612 (for example, a jacket) included in the image 610.

The electronic device 100 may compare the shape of the object detected and a plurality of images stored in a database stored in a memory (not shown) provided in the electronic device 100. In addition, the electronic device 100 may compare the shape of the object detected and a plurality of images stored in databases of other external electronic devices by using a communication module (not shown).

According to an embodiment, the electronic device 100 may set a search category based on the result of recognition. For example, when the electronic device 100 recognizes the clothes 612 in the image 610, the electronic device 100 may set "clothes" as the search category. Thereafter, the electronic device 100 may search and display only images related to "clothes" during a repeated search.

Referring to view (a) of FIG. 6, the electronic device 100 may display searched clothes images 620 on a lower end of the display 50.

Referring to view (a) of FIG. 6, the electronic device 100 may detect the clothes 612 in the inputted image 610, and may search and display an image including clothes similar to the detected clothes 612, and simultaneously or serially, may distinguish components included in the detected clothes 612.

The electronic device 100 may display the distinguished components on the display 50. Referring to view (a) of FIG. 6, the electronic device 100 may display an identifier 630 distinguishing the detected clothes 612 from the background.

According to various embodiments, the user may directly input the components included in the object displayed on the display 50. For example, when the electronic device 100 includes a display supporting a touch, the user may select a component by touching the component of the object displayed on the display, or by forming a looped curve to identify the component of the object by using a touch and drag method. For example, the user may select a zipper 613 existing in the clothes 612 by using the touch and drag method.

Referring to views (a) and (b) of FIG. 6, the user may combine the shapes, patterns, colors, sizes, etc. of the components of the object, and may search a similar image. For example, the electronic device 100 may display a fourth item 650 displaying conditions "AND, OR, NOT" for combining attributes, such as a shape, a color, a pattern, a size, etc., based on a user input of selecting a "condition" 640 icon.

The user may select one of the conditions included in the displayed fourth item 650.

Referring to views (b) and (c) of FIG. 6, the user may select the zipper 613 from the components of the clothes 612, and may select the "NOT condition" from the conditions displayed on the fourth item 650. In response to this, the electronic device 100 may set the clothes detected in view (a) of FIG. 6 as the search category, and may display an image 661 corresponding to the clothes 612 on an upper end of the display 50. In addition, the electronic device 100 display an image 663 corresponding to the zipper 613 of the clothes 612 selected by the user on an upper end of the display 50. The electronic device 100 may display the currently set condition by arranging an image (or text) 662 indicating the "NOT condition" selected by the user between the image 661 corresponding to the clothes and the image 663 corresponding to the zipper 613.

Accordingly, the electronic device 100 may search clothes images without the zipper 613 from among the results of searching in view (a) of FIG. 6 again, and may display the images on the display 50.

Referring to view (c) of FIG. 6, the user may rotate the image displayed on the display 50 and may display the opposite surface on the display 50. According to another embodiment, the user may display a new image on the display 50 using the camera module (not shown).

The electronic device 100 according to an embodiment may display the fourth item 650 displaying the conditions "AND, OR, NOT" for combining the attributes, such as a shape, a color, a pattern, a size, etc., based on a user input of selecting the "condition" 640 icon.

The user may select one of the conditions included in the displayed fourth items 650. In addition, the user may select a component to search from the components included in the object displayed on the display.

Referring to view (c) of FIG. 6, the user may select the "AND condition" from the conditions displayed on the fourth item 650, and may select a back slit 614 from the components of the clothes 612. The electronic device 100 may display an image 665 corresponding to the selected back slit 614 on an upper end of the display 50. The electronic device 100 may display the currently set condition by arranging an image (or text) 664 indicating the "AND condition" selected by the user between the image 663 corresponding to the zipper 613 of the clothes 612, and the image 665 corresponding to the back slit 614.

The electronic device 100 may search clothes images 620' which do not have the zipper 613 selected in view (b) of FIG. 6, and which are the same as or similar to the shape of the back slit 614 selected in view (c) of FIG. 6, and may display the images on the display 50.

FIG. 7 illustrates views to explain a situation in which a search term is changed in an electronic device according to an embodiment.

View (a) of FIG. 7 illustrates a similar situation to that of view (b) of FIG. 5B. The electronic device 100 may display predetermined search conditions and search attributes on an upper end of the display 50. In addition, the electronic device 100 may display images which are searched based on the predetermined search conditions and the search attributes on a lower end of the display 50. The electronic device 100 may display an image currently inputted through a camera module (not shown) or an image selected on a gallery application on the display 50.

According to an embodiment, the electronic device 100 may change the search attribute and the search condition based on a signal of selecting a search attribute and a search condition displayed on the display 50, and may search and display a result of searching on the display 50.

Referring to views (a) and (b) of FIG. 7, the electronic device 100 may change the search condition to the "OR condition," "NOT condition," etc. in sequence based on a signal input of touching the "AND condition" 730 displayed on the display 50, and may display the changed conditions. The electronic device 100 may display a result of searching on a lower end of the display 50 based on the changed search condition.

Referring to views (c) and (d) of FIG. 7, the electronic device 100 may change the search attribute to "color," "pattern," "size," or the like in sequence based on a signal input of touching "shape" 740 displayed on the display 50. The electronic device 100 may display a result of searching on a lower end of the display 50 based on the changed search attribute.

Figure 8A:
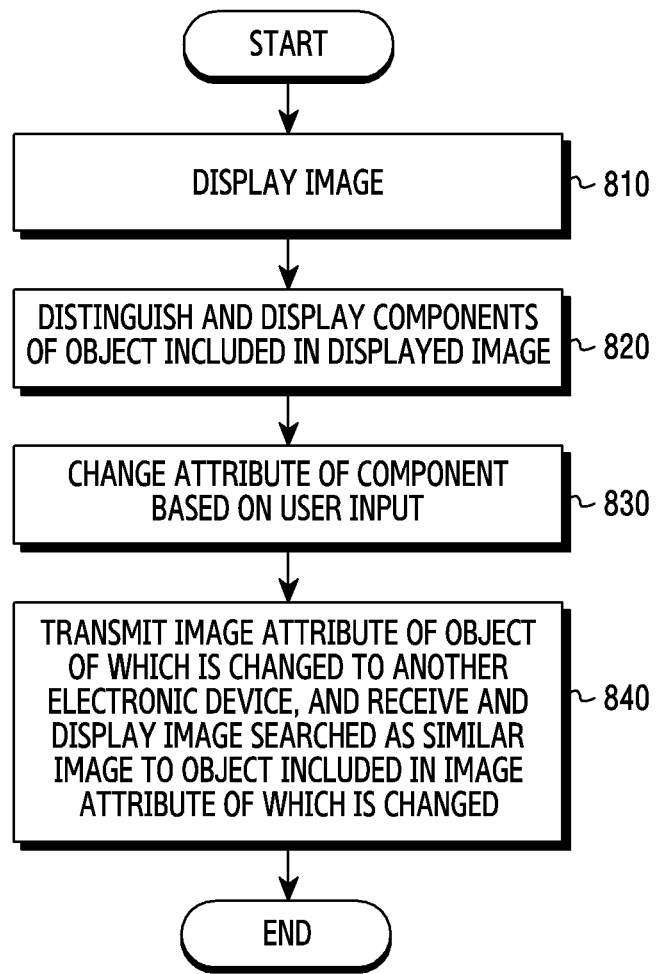
FIG. 8A is a flowchart to explain a situation in which an electronic device according to an embodiment recognizes an object in an image displayed on a display, and distinguishes and displays components, and detects an image similar to an image changed based on a user signal input of changing an attribute of the object.

FIG. 8A is a flowchart to explain a situation in which an electronic device according to an embodiment recognizes an object in an image displayed on a display and distinguishes and displays a component, and detects an image similar to an image changed based on a user signal input of changing an attribute of the object.

Referring to operation 810, the electronic device 100 may display an image. For example, the electronic device 100 may display an image generated based on an image inputted through a camera module on the display. In addition, the electronic device 100 may display an image selected in a gallery application on the display.

Referring to operation 820, the electronic device 100 may distinguish components included in an object included in the displayed image, and may display the components. For example, the electronic device 100 may convert the displayed image into an image highlighting an edge, and may compare the image and a plurality of images stored in a database of a memory provided therein or databases of other external electronic devices, and may distinguish and display the components.

Referring to operation 830, the electronic device 100 may change an attribute of the component displayed on the display based on a user input signal. According to an embodiment, the electronic device 100 may display the changed component on the display. For example, the electronic device 100 may change the object based on a signal of changing an attribute (for example, shape, color, size, pattern, etc.) of the component. In addition, the electronic device 100 may display the changed object on the display by using AR technology.

Referring to operation 840, the electronic device 100 may transmit the image whose object attribute (for example, an attribute of at least one of the components included in the object) is changed to another electronic device, and may receive and display an image which is searched as an image similar to an object included in the image whose attribute is changed. According to an embodiment, the electronic device 100 may set a search category based on the result of searching in operation 820. Accordingly, when the electronic device 100 searches the image similar to the image whose object attribute is changed, the electronic device 100 may search based on the set search category. Accordingly, the electronic device 100 can enhance a search speed or the accuracy of search.

Figure 8B:
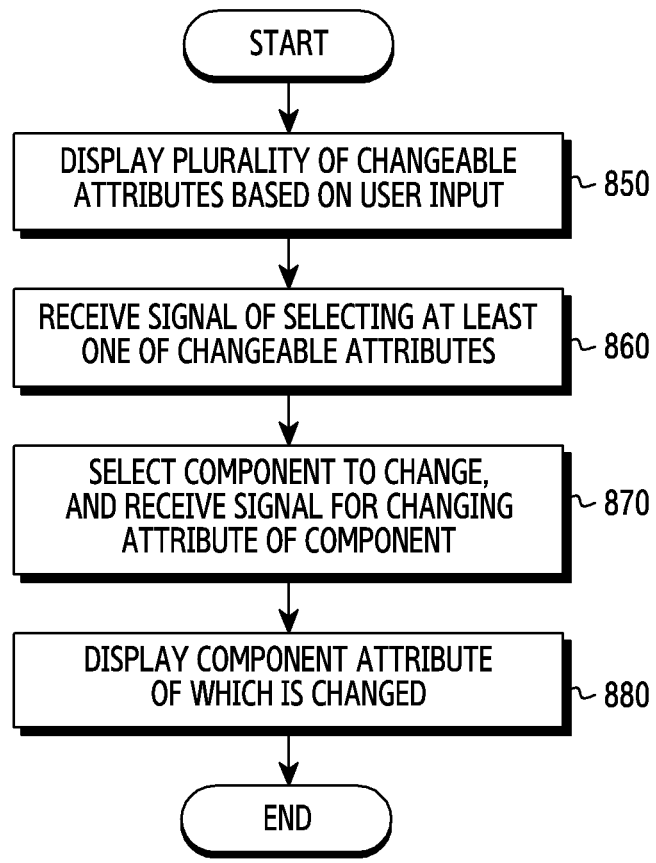
FIG. 8B is a flowchart to explain a situation in which an electronic device according to an embodiment changes a component of an object included in a displayed image based on a user's input signal.

FIG. 8B is a flowchart to explain a situation in which an electronic device according to an embodiment changes a component of an object included
in a displayed image based on an input signal of a user.
FIG. 8B may correspond to operation 830 of FIG. 8A.

Referring to operation 850, the electronic device 100 may display a plurality of changeable attributes based on a user's input. For example, the electronic device 100 may display a list of changeable attributes such as a shape, a color, a size, a pattern, etc. through a pop-up window.

Referring to operation 860, the electronic device 100 may receive a user's signal input of selecting at least one of the displayed plurality of attributes.

Referring to operation 870, the electronic device 100 may select a component to change from the components, and may receive a user's signal input of changing an attribute of the selected component. According to an embodiment, the user may select the size from the shape, color, size, pattern, and may select a component to change and change the size of the component. For example, the user may enlarge the size of the component by touching one side and the other side of the component and then moving in the opposite directions.

According to another embodiment, when the user selects the shape from the shape, color, size, pattern, the electronic device 100 may display various types of changeable shapes through a pop-up window. The electronic device 100 may change the shape of the selected component to a shape selected by the user, based on a user input signal of selecting one of the various types of shapes displayed on the pop-up window.

Referring to operation 880, the electronic device 100 may display the component whose attribute is changed. For example, the electronic device 100 may display the image whose attribute is changed by superimposing the image on the image displayed on the display. In this case, the image whose attribute is changed may be displayed translucently, for example. Accordingly, the user may see the image whose attribute is not changed and the image whose attribute is changed simultaneously. However, the method for the electronic device 100 to display the image whose attribute is changed is not limited thereto.

Figure 9:
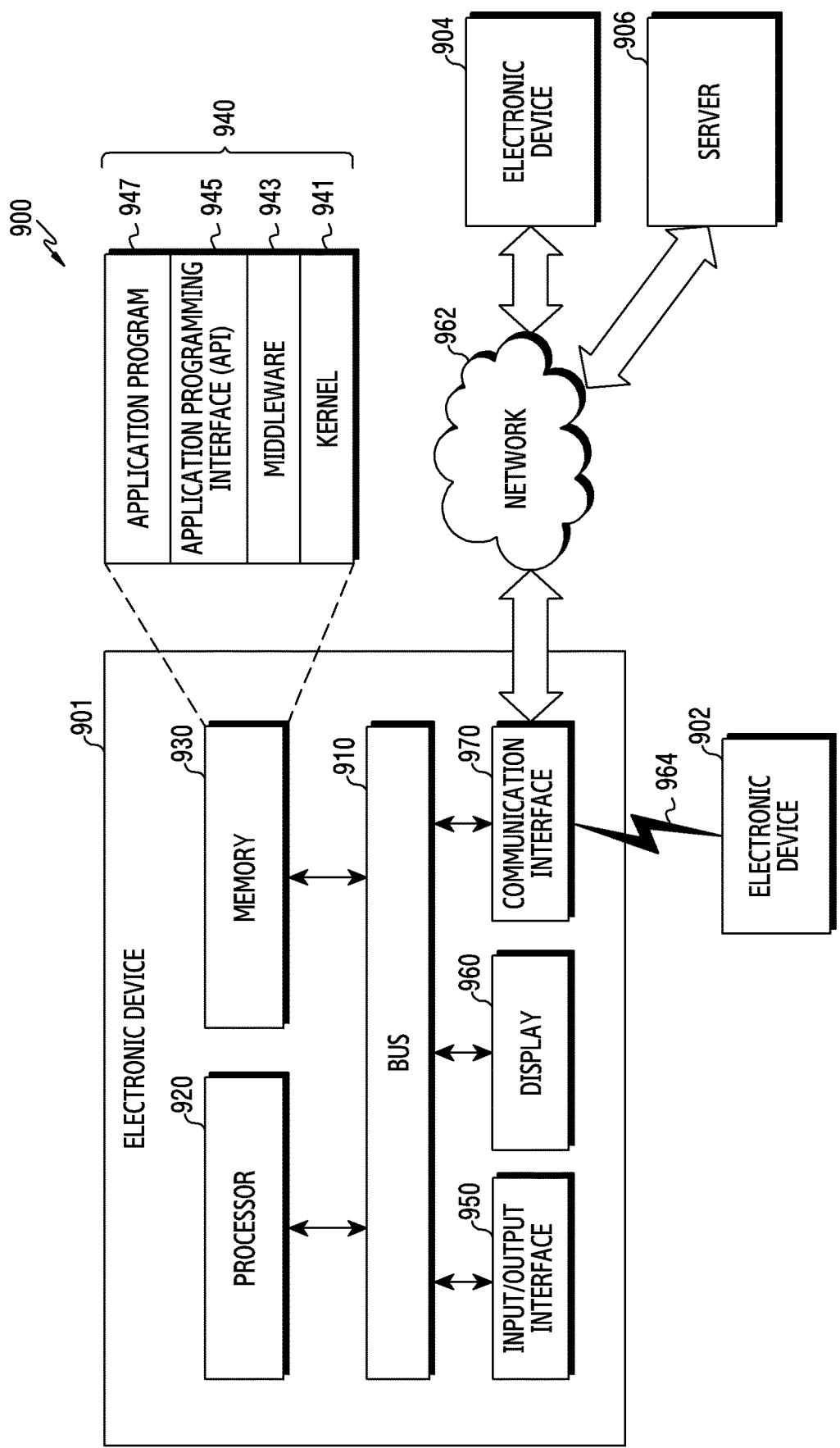
FIG. 9 is a view to explain an electronic device in a network environment according to various embodiments.

Referring initially to FIG. 9, an electronic device 901 resides in a network environment 900. The electronic device 901 can include the electronic device 100 of FIG. 1 or the electronic device 200 of FIG. 2. The electronic device 901 can include a bus 910, a processor 920, a memory 930, an input/output interface 950, a display 960, and a communication interface 970. The electronic device 901 may be provided without at least one of the components, or may include at least one additional component. The bus 910 can include a circuit for connecting the components 910 through 970 and delivering communication signals (e.g., control messages or data) therebetween. The processor 920 can include one or more of a CPU, an application processor, and a Communication Processor (CP). The processor 920 (e.g., processor 220 of FIG. 2), for example, can perform an operation or data processing with respect to control and/or communication of at least another component of the electronic device 901.

The memory 930 can include a volatile and/or nonvolatile memory. The memory 930, for example, can store commands or data relating to at least another component of the electronic device 901. According to an embodiment, the memory 930 can store software and/or a program 940. The program 940 can include, for example, a kernel 941, middleware 943, an Application Programming Interface (API) 945, and/or an application program (or "application") 947. At least part of the kernel 941, the middleware 943, or the API 945 can be referred to as an Operating System (OS). The kernel 941 can control or manage system resources (e.g., the bus 910, the processor 920, or the memory 930) used for performing operations or functions implemented by the other programs (e.g., the middleware 943, the API 945, or the application program 947). Additionally, the kernel 941 can provide an interface for controlling or managing system resources by accessing an individual component of the electronic device 901 from the middleware 943, the API 945, or the application program 947.

The middleware 943, for example, can serve an intermediary role for exchanging data between the API 945 or the application program 947 and the kernel 941 through communication. Additionally, the middleware 943 can process one or more job requests received from the application program 947, based on their priority. For example, the middleware 943 can assign a priority for using a system resource (e.g., the bus 910, the processor 920, or the memory 930) of the electronic device 901 to at least one of the application programs 947, and process the one or more job requests. The API 945, as an interface through which the application 947 controls a function provided from the kernel 941 or the middleware 943, can include, for example, at least one interface or function (e.g., an instruction) for file control, window control, image processing, or character control. The input/output interface 950, for example, can deliver commands or data inputted from a user or another external device to other component(s) of the electronic device 901, or output commands or data inputted from the other component(s) of the electronic device 901 to the user or another external device.

The display 960 (e.g., display 50 of FIG. 1, display 210 of FIG. 2)), for example, can include a Liquid Crystal Display (LCD), a Light Emitting Diode (LED) display, an Organic Light Emitting Diode (OLED) display, a MicroElectroMechanical Systems (MEMS) display, or an electronic paper display. The display 960, for example, can display various contents (e.g., texts, images, videos, icons, and/or symbols) to the user. The display 960 can include a touch screen, for example, and receive touch, gesture, proximity, or hovering inputs by using an electronic pen or a user's body part.

The communication interface 970 (e.g., communication module 230 of FIG. 2), for example, can set a communication between the electronic device 901 and an external device (e.g., a first external electronic device 902, a second external electronic device 904, or a server 906). For example, the communication interface 970 can communicate with the external device (e.g., the second external electronic device 904 or the server 906) over a network 962 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, as shown by an element 964 of FIG. 9, at least one of Wireless Fidelity (WiFi), LiFi (light fidelity), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 962 can include a telecommunications network, for example, at least one of computer network (e.g., LAN or WAN), Internet, and telephone network.

Each of the first and second external electronic devices 902 and 904 can be of the same as or of a different type from that of the electronic device 901. According to embodiments of the present disclosure, all or part of operations executed in the electronic device 901 can be executed by another electronic device or a plurality of electronic devices (e.g., the electronic device 902 or 904, or the server 906). To perform a function or service automatically or by request, instead of performing the function or the service by the electronic device 901, the electronic device 901 can request at least part of a function relating thereto from another device (e.g., the electronic device 902 or 904, or the server 906). The other electronic device (e.g., the electronic device 902 or 904, or the server 906) can perform the requested function or an additional function and send its result to the electronic device 901. The electronic device 901 can provide the requested function or service by processing the received result. In doing so, for example, cloud computing, distributed computing, or client-server computing techniques can be used.

Figure 10:
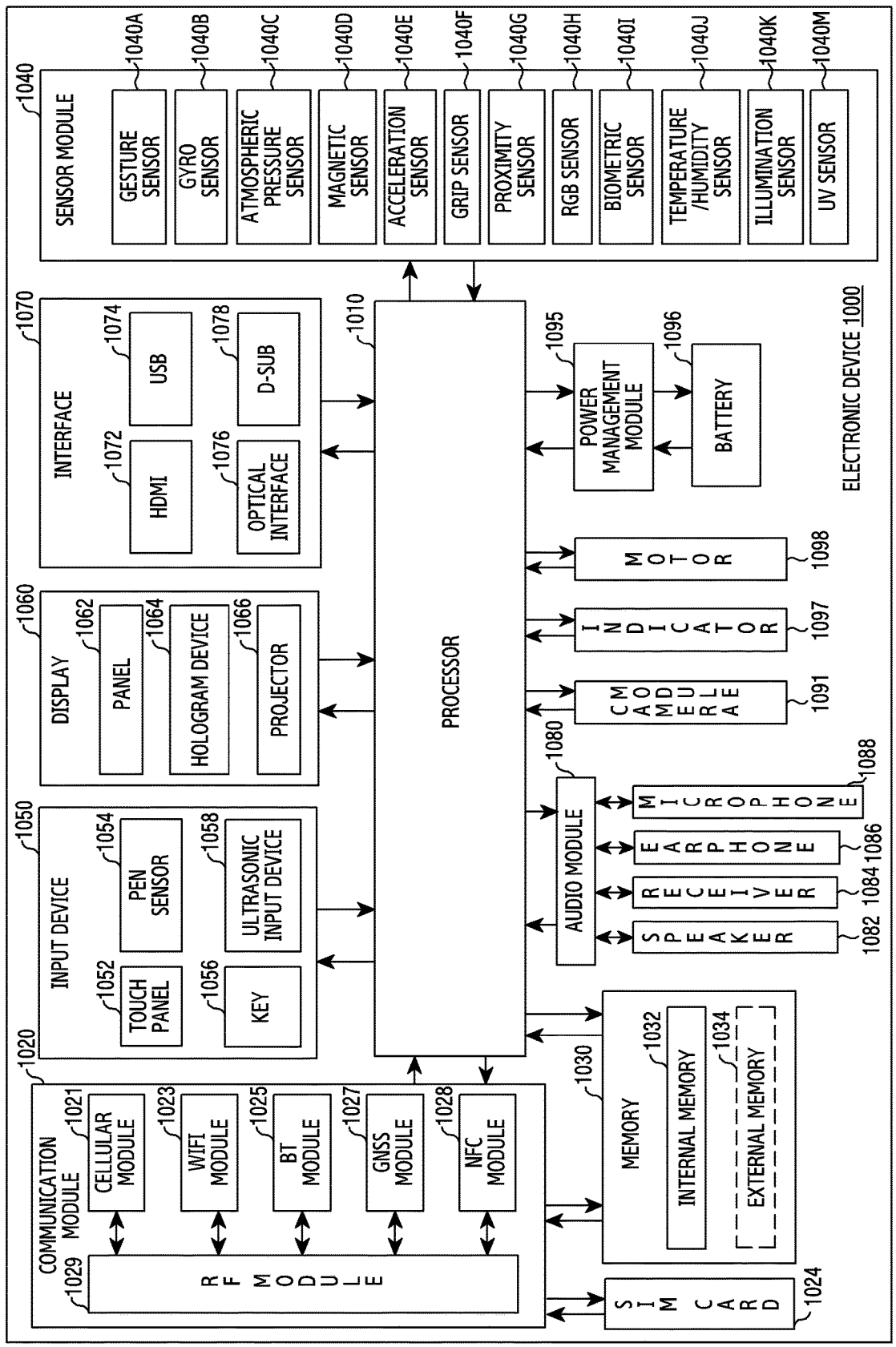
FIG. 10 is a block diagram of an electronic device according to various embodiments.

FIG. 10 is a block diagram of an electronic device 1001 according to an embodiment of the present disclosure. The electronic device 1001, for example, can include all or part of the above-described electronic device 100 of FIG. 1, electronic device 200 of FIG. 2 and/or electronic device 901 of FIG. 9. The electronic device 1001 includes one or more processors (e.g., an AP) 1010, a communication module 1020, a Subscriber Identification Module (SIM) 1024, a memory 1030, a sensor module 1040, an input device 1050, a display 1060, an interface 1070, an audio module 1080, a camera module 1091, a power management module 1095, a battery 1096, an indicator 1097, and a motor 1098. The processor 1010 (e.g., processor 220 of FIG. 2, processor 920 of FIG. 9), for example, can control a plurality of hardware or software components connected to the processor 1010, and also can perform various data processing and operations by executing an OS or an application program. The processor 1010 can be implemented with a System on Chip (SoC), for example. The processor 1010 can further include a Graphic Processing Unit (GPU) and/or an image signal processor. The processor 1010 may include at least part (e.g., a cellular module 1021) of the components shown in FIG. 2. The processor 1010 can load commands or data received from at least one other component (e.g., a nonvolatile memory) into a volatile memory, process them, and store various data in the nonvolatile memory.

The communication module 1020 (e.g., communication module 230 of FIG. 2) can have the same or similar configuration to the communication interface 970 of FIG. 9. The communication module 1020 can include, for example, the cellular module 1021, a WiFi module 1023, a Bluetooth (BT) module 1025, a GNSS module 1027, an NFC module 1028, and an RF module 1029. The cellular module 1021, for example, can provide voice call, video call, Short Message Service (SMS), or Internet service through a communication network. The cellular module 1021 can identify and authenticate the electronic device 1001 in a communication network by using the SIM (e.g., a SIM card) 1024. The cellular module 1021 can perform at least part of a function that the processor 1010 provides. The cellular module 1021 can further include a CP. At least some (e.g., two or more) of the cellular module 1021, the WiFi module 1023, the BT module 1025, the GNSS module 1027, and the NFC module 1028 can be included in one Integrated Circuit (IC) or an IC package. The RF module 1029, for example, can transmit/receive a communication signal (e.g., an RF signal). The RF module 1029, for example, can include a transceiver, a Power Amp Module (PAM), a frequency filter, a Low Noise Amplifier (LNA), or an antenna. According to another embodiment, at least one of the cellular module 1021, the WiFi module 1023, the BT module 1025, the GNSS module 1027, and the NFC module 1028 can transmit/receive an RF signal through an additional RF module. The SIM 1024, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 1030 (e.g., the memory 930) can include at least one of an internal memory 1032 and an external memory 1034. The internal memory 1032 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 1034 can include flash drive, for example, Compact Flash (CF), Secure Digital (SD), micro SD, mini SD, extreme digital (xD), Multi-Media Card (MMC), or memory stick.

The external memory 1034 can be functionally or physically connected to the electronic device 1001 through various interfaces.

The sensor module 1040 can, for example, measure physical quantities or detect an operating state of the electronic device 1001, and thus convert the measured or detected information into electrical signals. The sensor module 1040 can include at least one of a gesture sensor 1040A, a gyro sensor 1040B, an atmospheric pressure sensor 1040C, a magnetic sensor 1040D, an acceleration sensor 1040E, a grip sensor 1040F, a proximity sensor 1040G, a color sensor 1040H (e.g., a Red, Green, Blue (RGB) sensor), a bio sensor 1040I, a temperature/humidity sensor 1040J, an illumination sensor 1040K, and an Ultra Violet (UV) sensor 1040M. Additionally or alternatively, the sensor module 1040 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 1040 can further include a control circuit for controlling at least one sensor therein. The electronic device, as part of the processor 1010 or individually, can further include a processor configured to control the sensor module 1040 and thus control the sensor module 1040 while the processor 1010 is sleeping.

The input device 1050 can include at least one of a touch panel 1052, a (digital) pen sensor 1054, a key 1056, and an ultrasonic input device 1058. The touch panel 1052 can use at least one of, for example, capacitive, resistive, infrared, and ultrasonic methods. Additionally, the touch panel 1052 can further include a control circuit. The touch panel 1052 can further include a tactile layer to provide a tactile response to a user. The (digital) pen sensor 1054 can include, for example, part of a touch panel or a sheet for recognition. The key 1056 can include, for example, a physical button, a touch key, an optical key, or a keypad. The ultrasonic input device 1058 can detect ultrasonic waves from an input means through a microphone 1088 and check data corresponding to the detected ultrasonic waves.

The display 1060 (e.g., the display 50 of FIG. 1, the display 210 of FIG. 2, the display 960 of FIG. 9) can include at least one of a panel 1062, a hologram device 1064, a projector 1066, and/or a control circuit for controlling them. The panel 1062 can be implemented to be flexible, transparent, or wearable, for example. The panel 1062 and the touch panel 1052 can be configured with one or more modules. The panel 1062 can include a pressure sensor (or a force sensor) for measuring a pressure of the user touch. The pressure sensor can be integrated with the touch panel 1052, or include one or more sensors separately from the touch panel 1052. The hologram device 1064 can show three-dimensional images in the air by using the interference of light. The projector 1066 can display an image by projecting light on a screen. The screen, for example, can be placed inside or outside the electronic device 1001. The interface 1070 can include, for example, an HDMI 1072, a USB 1074, an optical interface 1076, or a D-subminiature (D-sub) 1078. The interface 1070 can be included in, for example, the communication interface 970 of FIG. 9. Additionally or alternatively, the interface 1070 can include a Mobile High-Definition Link (MHL) interface, a SD card/MMC interface, or an Infrared Data Association (IrDA) standard interface.

The audio module 1080, for example, can convert sounds into electrical signals and convert electrical signals into sounds. At least some components of the audio module 1080 can be included in, for example, the input/output interface 950 of FIG. 9. The audio module 1080 can process sound information inputted or outputted through a speaker 1082, a receiver 1084, an earphone 1086, or the microphone 1088. The camera module 1091, as a device for capturing still images and videos, can include one or more image sensors (e.g., a front sensor or a rear sensor), a lens, an Image Signal Processor (ISP), or a flash (e.g., an LED or a xenon lamp). The power management module 1095, for example, can manage the power of the electronic device 1001. According to an embodiment of the present disclosure, the power management module 1095 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 1096, or a voltage, current, or temperature of the battery 1096 during charging. The battery 1096 can include, for example, a rechargeable battery and/or a solar battery.

The indicator 1097 can display a specific state of the electronic device 1001 or part thereof (e.g., the processor 1010), for example, a booting state, a message state, or a charging state. The motor 1098 can convert electrical signals into mechanical vibration and generate a vibration or haptic effect. The electronic device 1001 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 1001) can be configured to include at least one of the above-described components or an additional component, or to not include some of the above-described components. Additionally, some of components in an electronic device are configured as one entity, so that functions of previous corresponding components are performed identically.

Figure 11:
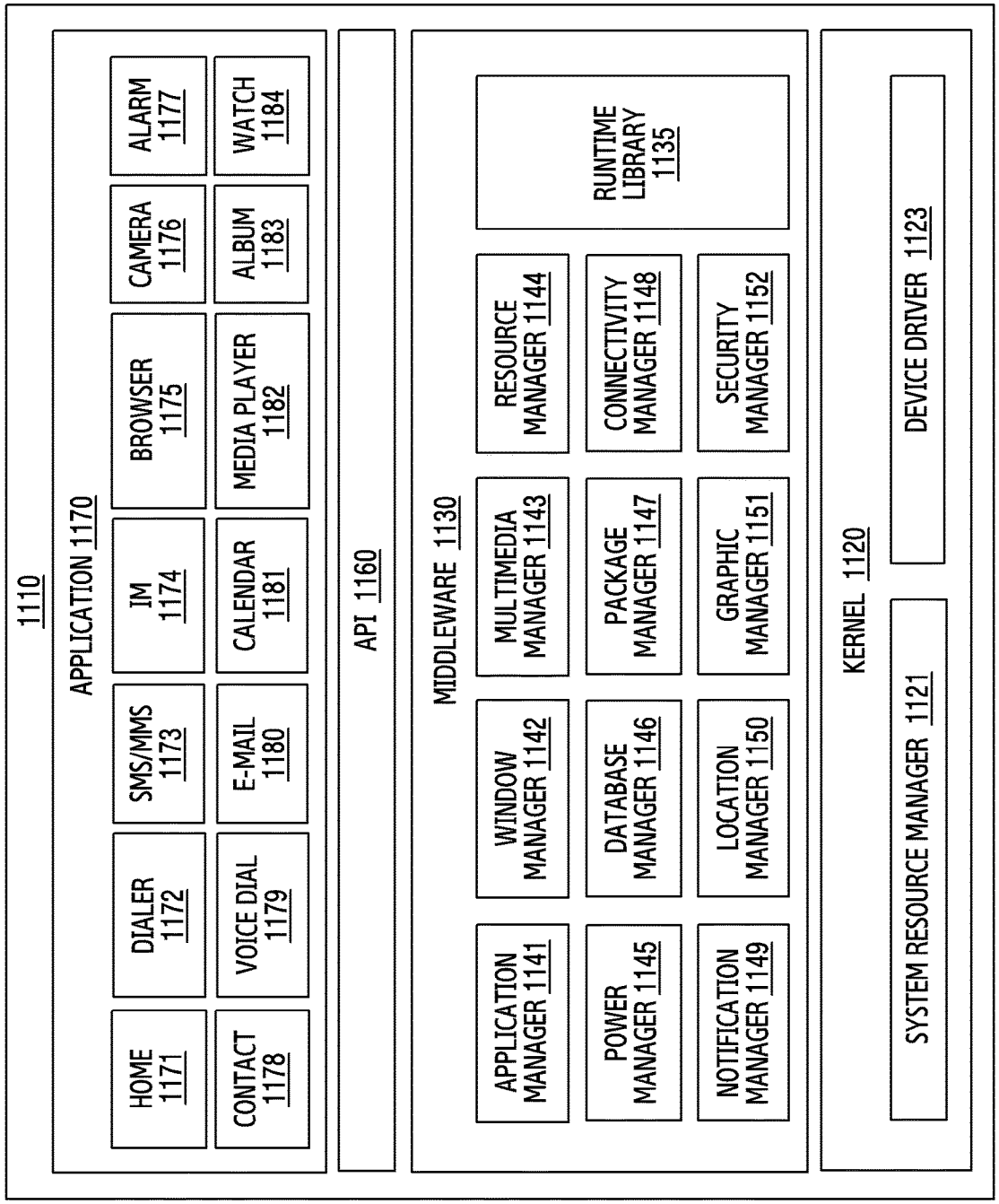
FIG. 11 is a block diagram of a program module according to various embodiments.

FIG. 11 is a block diagram of a program module according to an embodiment of the present disclosure. A program module 1110 (e.g., the program 940) can include an OS for controlling a resource relating to an electronic device (e.g., the electronic device 901, the electronic device 100) and/or various applications (e.g., the application program 947) running on the OS. The OS can include, for example, Android™, iOS™, Windows™, Symbian™, Tizen™, or Bada™. Referring to FIG. 11, the program module 1110 can include a kernel 1120 (e.g., the kernel 941), a middleware 1130 (e.g., the middleware 943), an API 1160 (e.g., the API 945), and/or an application 1170 (e.g., the application program 947). At least part of the program module 1110 can be preloaded on an electronic device or can be downloaded from an external electronic device (e.g., the electronic device 902, 904, or the server 906).

The kernel 1120 includes, for example, at least one of a system resource manager 1121 and/or a device driver 1123. The system resource manager 1121 can control, allocate, or retrieve a system resource. According to an embodiment, the system resource manager 1121 can include a process management unit, a memory management unit, or a file system management unit. The device driver 1123 can include, for example, a display driver, a camera driver, a Bluetooth driver, a sharing memory driver, a USB driver, a keypad driver, a WiFi driver, an audio driver, or an Inter-Process Communication (IPC) driver. The middleware 1130, for example, can provide a function commonly required by the application 1170, or can provide various functions to the application 1170 through the API 1160 in order to allow the application 1170 to efficiently use a limited system resource inside the electronic device. The middleware 1130 includes at least one of a runtime library 1135, an application manager 1141, a window manager 1142, a multimedia manager 1143, a resource manager 1144, a power manager 1145, a database manager 1146, a package manager 1147, a connectivity manager 1148, a notification manager 1149, a location manager 1150, a graphic manager 1151, and a security manager 1152.

The runtime library 1135 can include, for example, a library module used by a complier to add a new function through a programming language while the application 1170 is running. The runtime library 1135 can manage input/output, manage memory, or arithmetic function processing. The application manager 1141, for example, can manage the life cycle of the applications 1170. The window manager 1142 can manage a GUI resource used in a screen. The multimedia manager 1143 can recognize a format for playing various media files and encode or decode a media file by using the codec in a corresponding format. The resource manager 1144 can manage a source code of the application 11740 or a memory space. The power manager 1145 can manage the capacity, temperature, or power of the battery, and determine or provide power information for an operation of the electronic device using corresponding information among the capacity, temperature, and/or power of the battery. The power manager 1145 can operate together with a Basic Input/Output System (BIOS). The database manager 1146 can create, search, or modify a database used in the application 1170. The package manager 1147 can manage installation or updating of an application distributed in a package file format.

The connectivity manger 1148 can manage, for example, a wireless connection. The notification manager 1149 can provide an event, such as incoming messages, appointments, and proximity alerts, to the user. The location manager 1150 can manage location information of an electronic device. The graphic manager 1151 can manage a graphic effect to be provided to the user or a user interface relating thereto. The security manager 1152 can provide, for example, system security or user authentication. The middleware 1130 can include a telephony manager for managing a voice or video call function of the electronic device, or a middleware module for combining various functions of the above-described components. The middleware 1130 can provide a module specialized for each type of OS. The middleware 1130 can dynamically delete part of the existing components or add new components. The API 1160, as a set of API programming functions, can be provided as another configuration according to the OS. For example, Android or iSO can provide one API set for each platform, and Tizen can provide two or more API sets for each platform.

The application 1170 can include at least one of a home 1171, a dialer 1172, an SMS/Multimedia Messaging System (MMS) 1173, an Instant Message (IM) 1174, a browser 1175, a camera 1176, an alarm 1177, a contact 1178, a voice dial 1179, an e-mail 1180, a calendar 1181, a media player 1182, an album 1183, a clock 1184, health care (e.g., measure an exercise amount or blood sugar level), or environmental information (e.g., air pressure, humidity, or temperature information) provision application. The application 1170 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 1170 can include a specified application (e.g., a health care application of a mobile medical device) according to a property of the external electronic device. The application 1170 can include an application received from an external electronic device. At least part of the program module 1110 can be implemented (e.g., executed) with software, firmware, hardware (e.g., the processor 1010, the processor 920, the processor 220), or a combination of at least two of them, and include a module, a program, a routine, a set of instructions, or a process for executing one or more functions.

The term "module", as used herein, can imply a unit including hardware, software, and firmware, or any suitable combination. The term "module" can be interchangeably used with terms such as "unit", "logic", "logical block", "component", "circuit", and the like. A module can be a minimum unit of an integral component or can be a part thereof. A module can be a minimum unit for performing one or more functions or may be a part thereof. A module can be mechanically or electrically implemented. For example, a module, according to an embodiment of the present disclosure, can include at least one of an Application-Specific Integrated Circuit (ASIC) chip, a Field-Programmable Gate Arrays (FPGAs), and a programmable-logic device, which are known or will be developed and which perform certain operations. At least some parts of a device (e.g., modules or functions thereof) or a method (e.g., operations), based on embodiments of the present disclosure, can be implemented with an instruction stored in a non-transitory computer-readable storage medium (e.g., the memory 930) as a program module. When the instruction is executed by a processor (e.g., the processor 1010, the processor 920, the processor 220), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

What is claimed is:

1. An electronic device comprising:
a display;
communication circuitry; and
a processor electrically connected with the display and the communication circuitry,
wherein the processor is configured to control to:
recognize a product from an image displayed on the display, distinguish each of a plurality of parts constituting the product, and set a search category to the recognized product;
display a list including a plurality of items representing attributes related to the product in the image;
receive a first user input to select an item among the plurality of items in the list;
receive a second user input to select a first part among the plurality of parts constituting the product;
receive a third user input to change an attribute of the first part selected by the second user input, the attribute corresponding to the item selected by the first user input;
change the attribute of the first part based on the third user input, and select a search condition for the changed attribute of the first part; and
perform search based on the search category and the search condition, obtain at least one image corresponding to the search condition among a plurality of images related to the search category, and display the at least one image on the display,
wherein the search condition includes at least one of a condition in which an image containing the changed attribute of the first part is searched, and a condition in which an image excluding the changed attribute of the first part is searched.

2. The electronic device of claim 1, wherein the electronic device further comprises a camera, and
wherein the processor is further configured to control the camera to generate the image based on an image obtained by the camera, and to display the image on the display.

3. The electronic device of claim 1, wherein the attribute comprises at least one of a shape, a color, a pattern, or a size of the first part.

4. The electronic device of claim 1, wherein the processor is further configured to control to display the image by superimposing the first part that the attribute is changed from among the plurality of parts contained in the product on the image.

5. The electronic device of claim 1, wherein the processor is further configured to control to display a changed icon on the display.

6. The electronic device of claim 1, wherein the plurality of parts comprises the first part and a second part, and
wherein the processor is further configured to control to transmit a search condition for searching the first part and the second part to another electronic device based on a user input, and to receive the at least one image searched as an image similar to the recognized product according to the search condition from the another electronic device and to display the at least one image on the display.

7. A control method of an electronic device which comprises a display and communication circuitry, the method comprising:
displaying an image on the display;
recognizing a product detected from the image, distinguishing each of a plurality of parts constituting the product, and setting a search category to the recognized product;
displaying a list including a plurality of items representing attributes related to the product in the image;
receiving a first user input to select an item among the plurality of items in the list;
receiving a second user input to select a first part among the plurality of parts constituting the product;
receiving a third user input to change an attribute of the first part selected by the second user input, the attribute corresponding to the item selected by the first user input;
changing the attribute of the first part based on the third user input, and selecting a search condition for the changed attribute of the first part; and
searching based on the search category and the search condition, obtaining at least one image corresponding to the search condition among a plurality of images related to the search category, and displaying the at least one image on the display,
wherein the search condition includes at least one of a condition in which an image containing the changed attribute of the first part is searched, and a condition in which an image excluding the changed attribute of the first part is searched.

8. The control method of claim 7, wherein the electronic device further comprises a camera, and
wherein the control method comprises generating the image based on an image obtained by the camera, and displaying the image on the display.

9. The control method of claim 7, further comprising:
displaying the image by superimposing the first part, that the attribute is changed, from among the plurality of parts contained in the product on the image.

10. The control method of claim 7, wherein the plurality of parts comprises the first part and a second part, and
wherein the control method comprises transmitting a search condition for searching the first part and the second part to another electronic device based on a user input, and receiving the at least one image searched as an image similar to the recognized product according to the search condition from the another electronic device, and displaying the at least one image on the display.

11. A computer program product comprising a non-transitory computer-readable recording medium storing instructions for executing operations in an electronic device comprising a processor, the operations comprising:
displaying an image on a display of the electronic device;
recognizing a product detected from the image, distinguishing each of a plurality of parts constituting the product, and setting a search category to the recognized product;
displaying a list including a plurality of items representing attributes related to the product in the image;
receiving a first user input to select an item among the plurality of items in the list;
receiving a second user input to select a first part among the plurality of parts constituting the product;
receiving a third user input to change an attribute of the first part selected by the second user input, the attribute corresponding to the item selected by the first user input;
changing the attribute of the first part based on the third user input, and selecting a search condition for the changed attribute of the first part; and searching based on the search category and the search condition, obtaining at least one image corresponding to the search condition among a plurality of images related to the search category, and displaying the at least one image on the display, wherein the search condition includes at least one of a condition in which an image containing the changed attribute of the first part is searched, and a condition in which an image excluding the changed attribute of the first part is searched.

12. The computer program product of claim 11, wherein the electronic device further comprises a camera, and wherein the operations comprising generating the image based on an image obtained by the camera, and displaying the image on the display.

13. The computer program product of claim 11, wherein the attribute comprises at least one of a shape, a color, a pattern, or a size of the first part.

14. The computer program product of claim 11, wherein the operations comprising displaying the image by superimposing the first part that the attribute is changed from among the plurality of parts contained in the product on the image.

* * * * *